United States Patent [19]
Patel et al.

[11] Patent Number: 5,600,380
[45] Date of Patent: Feb. 4, 1997

[54] GHOST-CANCELATION REFERENCE SIGNAL ACQUISITION CIRCUITRY, AS FOR TV RECEIVER OR VIDEO RECORDER

[75] Inventors: Chandrakant B. Patel, Hopewell, N.J.; Jian Yang, Norwood, Mass.

[73] Assignee: Samsung Electronics Co., Ltd., Kyungki-do, Rep. of Korea

[21] Appl. No.: 228,356

[22] Filed: Apr. 15, 1994

Related U.S. Application Data

[63] Continuation-in-part of Ser. No. 984,488, Dec. 2, 1992, abandoned.

[51] Int. Cl.$^6$ .............................. H04N 5/21; H04N 5/213
[52] U.S. Cl. ............................................................. 348/614
[58] Field of Search .................................... 348/614, 611, 348/607, 608, 612, 914; H04N 5/213, 5/21

[56] References Cited

U.S. PATENT DOCUMENTS

| | | |
|---|---|---|
| 4,044,381 | 8/1977 | Shimano et al. . |
| 4,481,643 | 11/1984 | Kitazawa . |
| 4,563,706 | 1/1986 | Nagashima . |
| 4,864,403 | 9/1989 | Chao et al. . |
| 4,896,213 | 1/1990 | Kobo et al. . |
| 4,897,725 | 1/1990 | Tanaka et al. . |
| 4,912,557 | 3/1990 | Faroudja . |
| 5,032,916 | 7/1991 | Matsuura et al. . |
| 5,051,839 | 9/1991 | Nakahara et al. . |

(List continued on next page.)

FOREIGN PATENT DOCUMENTS

| | | |
|---|---|---|
| 0040801 | 12/1981 | European Pat. Off. . |
| 0420688 | 4/1991 | European Pat. Off. . |
| 0465194 | 1/1992 | European Pat. Off. . |
| 0511708 | 11/1992 | European Pat. Off. . |
| 2252370 | 10/1990 | Japan . |
| 0252370 | 10/1990 | Japan ........................ H04N 5/21 |
| 4088756 | 3/1992 | Japan . |
| 4286277 | 10/1992 | Japan . |

OTHER PUBLICATIONS

IEEE Transactions on Broadcasting, vol. 35, No. 4, Dec. 1989, pp. 339–347.
IEEE Transactions on Consumer Electronics, vol. CE–25, Feb. 1979, "A Tutorial On Ghost Cancelling In Television Receivers", W. Ciciora et al., pp. 9–43.
Patent Abstracts of Japan, vol. 16, No. 316 (E–1231), Jul. 10, 1992, JPA 4–88756.
Patent Abstracts of Japan, vol. 17, No. 94 (E–1325), Feb. 24, 1993, JPA 4–286277.

*Primary Examiner*—Micheal H. Lee
*Attorney, Agent, or Firm*—Sughrue, Mion, Zinn, Macpeak & Seas

[57] ABSTRACT

A first composite video signal may include attendant ghosts and sometimes includes in a prescribed $L^{th}$ line of each field during the vertical blanking interval one of a cycle of M ghost-canceling reference (GCR) signals of prescribed magnitude and respective phasing. Filter circuitry generates a second composite video signal in response to the first composite video signal, which is adjusted in response to filter programming signals generated by a computer storing a ghost-free GCR signal. The computer receives a GCR signal with attendant ghosts and compares it to the stored ghost-free GCR signal, thereby carrying out correlation procedures for calculating the filter programming signals. The second composite video signal is a response to the first composite video signal in which the attendant ghosts are lessened. Synchronizing pulses are separated from the composite video signals and a scan line counter counts the horizontal synchronizing pulses, generating a line count, and is reset to an initial line count by each vertical synchronizing pulse. An $L^{th}$-line separator responds to the line count for separating the scan lines of the second composite video signal that include GCR signals. A field counter counts the vertical synchronizing pulses modulo M, generating a field count synchronized to the cycle of M. GCR signals. A temporal filter combines M×N successive scan lines to generate a temporal filter response supplied to the computer as a noise-reduced GCR signal with attendant ghosts.

30 Claims, 5 Drawing Sheets

U.S. PATENT DOCUMENTS

| | | |
|---|---|---|
| 5,053,870 | 10/1991 | Ito et al. . |
| 5,055,929 | 10/1991 | Sakai . |
| 5,111,298 | 5/1992 | Koo . |
| 5,113,262 | 5/1992 | Strolle et al. . |
| 5,130,799 | 7/1992 | Iga et al. ................... 348/614 |
| 5,170,260 | 12/1992 | Tabata . |
| 5,335,009 | 8/1994 | Sun et al. ................... 348/614 |

(*) DIFFERENCE BETWEEN TWO CONSECUTIVE CHANNEL ESTIMATIONS IS BELOW THRESHOLD (**) RESIDUE GHOSTS IN BOTH STEP 84 AND STEP 92 CHANNEL CHARACTERIZATIONS ARE ALL BELOW THRESHOLD

GHOST-CANCELATION REFERENCE SIGNAL ACQUISITION CIRCUITRY, AS FOR TV RECEIVER OR VIDEO RECORDER

This is a continuation-in-part of U.S. patent application Ser. No. 07/984,488 filed Dec. 2, 1992, and abandoned as of the filing of this continuation application.

FIELD OF THE INVENTION

The invention relates to ghost-cancelation circuitry as used in a television receiver or a video tape recorder and, more particularly, to the acquisition of ghost-canceling reference (GCR) signals used as a basis for calculating the parameters of filters used for suppressing ghosts in composite video signals supplied from the video detector of a TV receiver or video tape recorder.

RELATED APPLICATIONS

A U.S. patent application filed by the inventors on even date with the application for this patent and entitled "METHODS FOR OPERATING GHOST-CANCELATION CIRCUITRY FOR TV RECEIVER OR VIDEO RECORDER" describes in somewhat greater detail the calculations of a filter coefficient computer in the ghost-cancelation circuitry described herein.

The benefits of priority under Section 120 of United States Code 35 are claimed based from the following U.S. patent applications.

U.S. patent application Ser. No. 07/872,077, filed Apr. 22, 1992 for Chandrakant B. Patel and Jian Yang entitled GHOST CANCELLATION REFERENCE SIGNAL AND TELEVISION RECEIVER USING SAME describes in connection with FIGS. 5, 6, 10 and 11 of its drawing ghost-cancelation reference signal acquisition circuitry, as for a TV receiver.

U.S. patent application Ser. No. 07/984,488 filed Dec. 2, 1992, for Chandrakant Patel and Jian Yang, and entitled GHOST-CANCELATION REFERENCE SIGNAL ACQUISITION CIRCUITRY, AS FOR TV RECEIVER OR VIDEO RECORDER, abandoned as of the filing of this continuation application.

U.S. patent application Ser. No. 07/921,686 filed 30 Jul. 1992 for Chandrakant B. Patel and entitled SYSTEM, APPARATUS AND METHOD FOR CANCELING TELEVISION GHOST SIGNALS is a continuation-in-part of U.S. patent application Ser. No. 07/623,563 filed 7 Dec. 1990, and now abandoned, which latter application is a continuation-in-part of U.S. patent application Ser. No. 07/609,522 filed 5 Nov. 1990, and now abandoned. Application Ser. No. 07/921,686 describes, with reference to FIG. 6 of its drawing, one of the GCR signal acquisition circuits claimed herein.

U.S. patent application Ser. No. 07/955,016 filed for Chandrakant B. Patel and Min Hyung Chung on 1 Oct. 1992 and entitled VIDEO TAPE RECORDER WITH TV RECEIVER FRONT END & GHOST-SUPPRESSION CIRCUITRY describes, with reference to FIG. 2 of its drawing, one of the GCR signal acquisition circuits claimed herein.

At the time these inventions were made all the inventors were under obligation to assign their inventions to Samsung Electronics Company, Ltd., incorporated in the Republic of Korea.

BACKGROUND OF THE INVENTION

Television engineers have given considerable thought to ghost-cancelation circuitry for inclusion in television receivers that also include a display device for reproducing the television image in a form suitable for viewing by humans. Ghost images, caused by multipath reception and commonly referred to as "ghosts", are a common occurrence in television pictures that have been broadcast over the air or have been transmitted by cable.

The signal to which the television receiver synchronizes is the strongest of the signals it receives, which is called the reference signal, and is usually the direct signal received over the shortest reception path. The multipath signals received over other paths are thus usually delayed with respect to the reference signal and appear as trailing ghost images. It is possible, however, that the direct or shortest path signal is not the signal to which the receiver synchronizes. When the receiver synchronizes to a reflected (longer path) signal, there will be a leading ghost image caused by the direct signal, or there will be a plurality of leading ghosts caused by the direct signal and other reflected signals of lesser delay than the reflected signal to which the receiver synchronizes. The parameters of the multipath signals— namely, the number of different-path responses, the relative amplitudes of the different-path responses, and the differential delay times between different ones of the different-path responses—vary from location to location and from channel to channel at a given location. These parameters may also be time-varying.

The visual effects of multipath distortion can be broadly classified in two categories: multiple images and distortion of the frequency response characteristic of the channel. Both effects occur due to the time and amplitude variations among the multipath signals arriving at the reception site. When the relative delays of the multipath signals with respect to the reference signal are sufficiently large, the visual effect is observed as multiple copies of the same image on the television display displaced horizontally from each other. These copies are sometimes referred to as "macroghosts" to distinguish them from "microghosts", which will be presently described. In the usual case in which the direct signal predominates and the receiver is synchronized to the direct signal, the ghost images are displaced to the right at varying position, intensity and polarity. These are known as trailing ghosts or "post-ghost" images. In the less frequently encountered case where the receiver synchronizes to a reflected signal, there will be one or more ghost images displaced to the left of the reference image. These are known as leading ghosts or "pre-ghost" images.

Multipath signals of relatively short delays with respect to the reference signal do not cause separately discernible copies of the predominant image, but do introduce distortion into the frequency response characteristic of the channel. The visual effect in this case is observed as increased or decreased sharpness of the image and in some cases loss of some image information. These short-delay, close-in or nearby ghosts are commonly caused by unterminated or incorrectly terminated radio-frequency transmission lines such as antenna lead-ins or cable television drop cables. In a cable television environment, it is possible to have multiple close-in ghosts caused by the reflections introduced by having several improperly terminated drop cables of varying lengths. Such multiple close-in ghosts are frequently referred to as "micro-ghosts".

Long multipath effects, or macroghosts, are typically reduced by cancelation schemes. Short multipath effects, or microghosts, are typically alleviated by waveform equalization, generally by peaking and/or group-delay compensation of the video frequency response.

Since the characteristics of a transmitted television signal are known a priori, it is possible, at least in theory, to utilize such characteristics in a system of ghost signal detection and cancelation. Nevertheless, various problems limit this approach. Instead, it has been found desirable to transmit repeatedly a reference signal situated, for example, in a section of the TV signal that is currently unused for video purposes and to utilize this reference signal for detection of ghost signals prior to arranging for the suppression of ghost signals. Typically, lines in the vertical blanking interval (VBI) are utilized. Such a signal is herein referred to as a Ghost Canceling Reference (GCR) signal; and a variety of different GCR signals have been described in patents and other technical publications.

Bessel pulse chirp signals are used in the GCR signal recommended for adoption as a standard for television broadcasting in the United States of America. The distribution of energy in the Bessel pulse chirp signal has a flat frequency spectrum extending continuously across the video frequency band. The chirp starts at the lowest frequency and sweeps upward in frequency therefrom to the 4.1 MHz highest frequency. The chirps are inserted into the first halves of selected VBI lines, the $19^{th}$ line of each field currently being preferred. The chirps, which are on +30 IRE pedestals, swing from −10 to +70 IRE and begin at a prescribed time after the trailing edges of the preceding horizontal synchronizing pulses. The chirp signals appear in an eight-field cycle in which the first, third, fifth and seventh fields have a polarity of color burst defined as being positive and the second, fourth, sixth and eighth fields have an opposite polarity of color burst defined as being negative. The initial lobe of a chirp signal ETP that appears in the first, third, sixth and eighth fields of an eight-field cycle swings upward from the +30 IRE pedestal to +70 IRE level. The initial lobe of a chirp signal ETR that appears in the second, fourth, fifth and seventh fields of the eight-field cycle swings downward from the +30 IRE pedestal to −10 IRE level and is the complement of the ETP chirp signal.

The strategy for eliminating ghosts in a television receiver relies on the transmitted GCR signal suffering the same multipath distortions as the rest of the television signal. Circuitry in the receiver can then examine the distorted GCR signal received and, with a priori knowledge of the distortion-free GCR signal, can configure an adaptive filter to cancel, or at least significantly attenuate, the multipath distortion. A GCR signal should not take up too much time in the VBI (preferably no more than one TV line), but should still contain sufficient information to permit circuitry in the receiver to analyze the multipath distortion and configure a compensating filter to cancel the distortion.

The GCR signals are used in the television receiver for calculating the adjustable weighting coefficients of a ghost-cancelation filter through which the composite video signal from the video detector is passed to supply a response in which ghosts are suppressed. The weighting coefficients of this ghost-cancelation filter are adjusted so it has a filter characteristic complementary to that of the transmission medium giving rise to the ghosts. The GCR signals can be further used for calculating the adjustable weighting coefficients of an equalization filter connected in cascade with the ghost-cancelation filter, for providing an essentially flat frequency spectrum response (or other preferred frequency spectrum response) over the complete reception path through the transmitter vestigial-sideband amplitude-modulator, the reception medium, the television receiver front-end and the cascaded ghost-cancelation and equalization filters.

W. Ciciora et alii in "A Tutorial on Ghost Canceling in Television Receivers", IEEE Transactions on Consumer Electronics, vol. CE-25, 2/79, pp. 9–43, indicates that a GCR signal may appropriately exhibit a (sin x)/x waveform. Such a waveform, suitably windowed, exhibits a relatively constant spectral energy density over a frequency band of interest. Ghost locations can then be determined so a filters can be configured for ghost signal cancelation to reduce the effects of long multipaths and for waveform equalization to reduce the effects of short multipaths.

In U.S. Pat. No. 4,897,725 issued 30 Jan. 1990 to Tanaka et alii and entitled "GHOST CANCELLING CIRCUIT" a transmitted reference or GCR signal is used that is substantially the proposed BTA (Japanese) GCR signal and that utilizes as the main reference or deghosting signal a (sin x)/x waveform. This (sin x)/x waveform as received together with ghosts thereof is Fourier transformed to provide a set of Fourier coefficients. The Fourier transform of the ghosted GCR signal is then processed with an available Fourier transform of an unimpaired GCR to compute the deghosting filter parameters, that is, tap gain information for both an infinite-impulse-response (IIR) deghosting filter and a finite-impulse-response (FIR) waveform equalization filter.

U.S. Pat. No. 4,896,213 issued 23 Jan. 1990 to Kobo et alii and entitled "GHOST CANCELLING REFERENCE SIGNAL TRANSMISSION/RECEPTION SYSTEM" discloses a system with a built-in ghost cancelling device for reducing or eliminating ghost components attributable to group-delay distortion and frequency-versus-amplitude characteristic distortion generated in a signal reception path. A digital signal composed of frame synchronizing signals, clock synchronizing signals, and data signals is generated and superposed on a television signal to be transmitted, during a VBI scan line thereof. At the receiving end, the digital signal is utilized as a ghosted GCR signal in an arrangement that correlates that signal with its known non-ghosted GCR signal to control adaptive filtering of the video signal to reduce the ghost phenomenon.

U.S. Pat. No. 4,864,403 issued 5 Sep. 1989 to Chao et alii and entitled "ADAPTIVE TELEVISION GHOST CANCELLATION SYSTEM INCLUDING FILTER CIRCUITRY WITH NON-INTEGER SAMPLE DELAY" describes the use of an IIR deghosting filter using interpolative techniques.

U.S. Pat. No. 4,864,403 issued 10 Sep. 1991 to Koo and entitled "METHOD AND APPARATUS FOR COMMUNICATION CHANNEL IDENTIFICATION AND SIGNAL RESTORATION" describes method and apparatus for calculating ghost-suppression-filter parameters in a television receiver.

U.S. Pat. No. 4,044,381 issued 23 Aug. 1977 to Shimano et alii and entitled "AUTOMATIC WAVEFORM EQUALIZING SYSTEM FOR TELEVISION RECEIVER" describes a waveform equalizer filter as may be used to suppress microghosts.

U.S. Pat. No. 5,032,916 issued 16 Jul. 1991 to Matsura et alii and entitled "METHOD OF DETECTING SIGNAL WAVEFORM DISTURBANCE IN RECEIVED TELEVISION SIGNAL" describes the pairwise combination of VBI intervals containing antiphase GCR signals and in-phase other reference signals, in order to suppress longer-delayed macroghosts.

Since the known ghost-cancelation schemes rely to a high degree on cancelation procedures, the time-base stability of the GCR signal in the received television signal is critical in order for the procedure of determining the weights for the ghost cancelation and equalizing filters by analyzing the GCR signal to work well. The theoretical validity of a ghost-cancelation procedure using weighted summation of differentially delayed video signals depends on the same signal with different delays having given rise to the ghosted signal. If the length of scan lines is different during the GCR signal reception than during other portions of the video signal, then the weights determined for generating ghost-free GCR signal by weighted summation of variously delayed GCR signals will not be appropriate for generating ghost-free video at other times by weighted summation of variously delayed video signals. In a television receiver with included display device and ghost cancelation circuitry, the problem of time-base stability of the detected video signals is not a problem when receiving off-the-air broadcast signals or when receiving such signals as relayed by cable broadcasting or community antenna systems.

However, a television receiver with included display device and ghost-cancelation circuitry often will not perform its ghost-cancelation procedures satisfactorily when the receiver receives radio frequency (r-f) signal (or composite video signal) from a home video cassette recorder (VCR) that has recorded a television signal containing ghosts. Home VCRs use helical scanning of the electromagnetic tape, with head switching taking place shortly before the vertical retrace interval. There is time-base instability in the video signal reproduced from the electromagnetic tape during playback, which time-base instability unfortunately under practical circumstances often persists throughout the vertical retrace interval and to some extent in the first few active lines of video signal, which are used to generate the topmost portion of the picture on the display device of the television receiver. The weighing coefficients calculated by a microcomputer in the TV receiver in response to an evaluation of the GCR signal occurring in one scan line during the vertical blanking interval will not be correct for the active video signal in later scan lines of the same field, or of subsequent fields, because the scan lines of active video do not have the same actual time duration as the scan line in which GCR signal occurs. Even the VBI scan lines in which the GCR signals are included may have different durations from field to field.

Good time-base stability is essential also in implementing the inventions claimed herein, where the 19$^{th}$ scan lines of several fields are differentially delayed thereafter to be linearly combined in order to separate a GCR signal component from accompanying horizontal sync pulse, front porch, back porch including color burst and +30 IRE GCR signal pedestal components. These accompanying components will not cancel out well if there be errors in the timing of the samples of the 19$^{th}$ scan lines when those lines are digitized to facilitate their being differentially delayed using temporary digital memory. Home VCRs generally are not capable of providing the requisite time-base stability for separating GCR signal this way. U.S. patent application Ser. No. 07/955,016 discloses that this problem is obviated by including ghost-cancelation circuitry after the video detector of the television receiver front end included in a home VCR.

SUMMARY OF THE INVENTION

A first composite video signal is subject to having attendant ghosts and includes at least at times in a prescribed Lth line of each field during the vertical blanking interval one of a cycle of M ghost-canceling reference (GCR) signals of prescribed magnitude and respective phasing, M being an integer larger than one. Filter circuitry generates a second composite video signal in response to the first composite video output signal, which response is adjusted in response to filter programming signals generated by a computer that stores in a computer memory associated therewith a ghost-free GCR signal. The computer is connected for receiving a GCR signal with attendant ghosts, which the computer compares with the ghost-free GCR signal stored in its associated memory, in carrying out correlation procedures that are the basis for calculating the filter programming signals. The filter programming signals are computed such that the second composite video signal is a response to the first composite video output signal in which the attendant ghosts are substantially reduced. Horizontal and vertical synchronizing pulses are separated from one of said first and second composite video signals. A scan line counter counts the separated horizontal synchronizing pulses for generating a line count and is reset to an initial line count by each separated vertical synchronizing pulse. An Lth-line separator responds to the line count for separating the scan lines of the second composite video signal that include GCR signals. A field counter counts the separated vertical synchronizing pulses modulo M, generating a field count synchronized to the cycle of M fields with differing GCR signals. A temporal filter combines corresponding pixels from a number MN of successive scan lines as separated by the Lth-line separator to generate a filter response that is supplied to the computer as a noise-reduced GCR signal with attendant ghosts, N being a positive integer. This temporal filter constructively combines the GCR signals selected from prescribed vertical-blanking-interval horizontal scan lines in a number of consecutive fields and destructively combines the pedestals on which these GCR signals are originally superposed, to recover a noise-reduced GCR signal free of accompanying pedestal. In certain embodiments of the invention this temporal filter is also relied on to destructively combine the horizontal synchronizing pulses, color burst and other components in the prescribed vertical-blanking-interval horizontal scan lines (and perhaps in neighboring lines as well), reducing the need for windowing the Bessel chirp and increasing the time range over which ghosts of the GCR signal can be detected.

Figure 3:
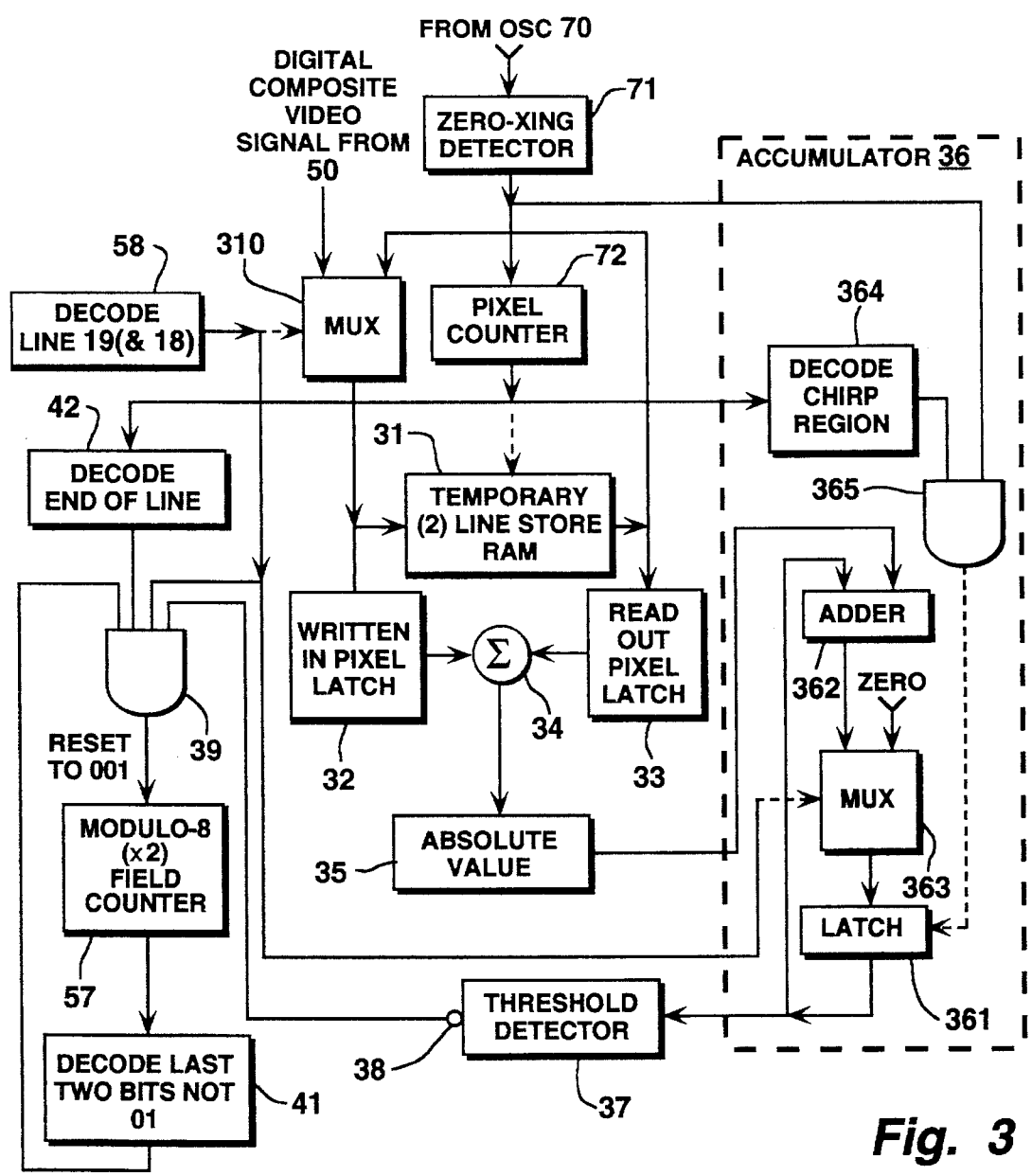
FIG. 3 is a schematic diagram of circuitry for resetting a modulo-eight field counter in the FIG. 2 ghost-suppression circuitry.
Figure 2:
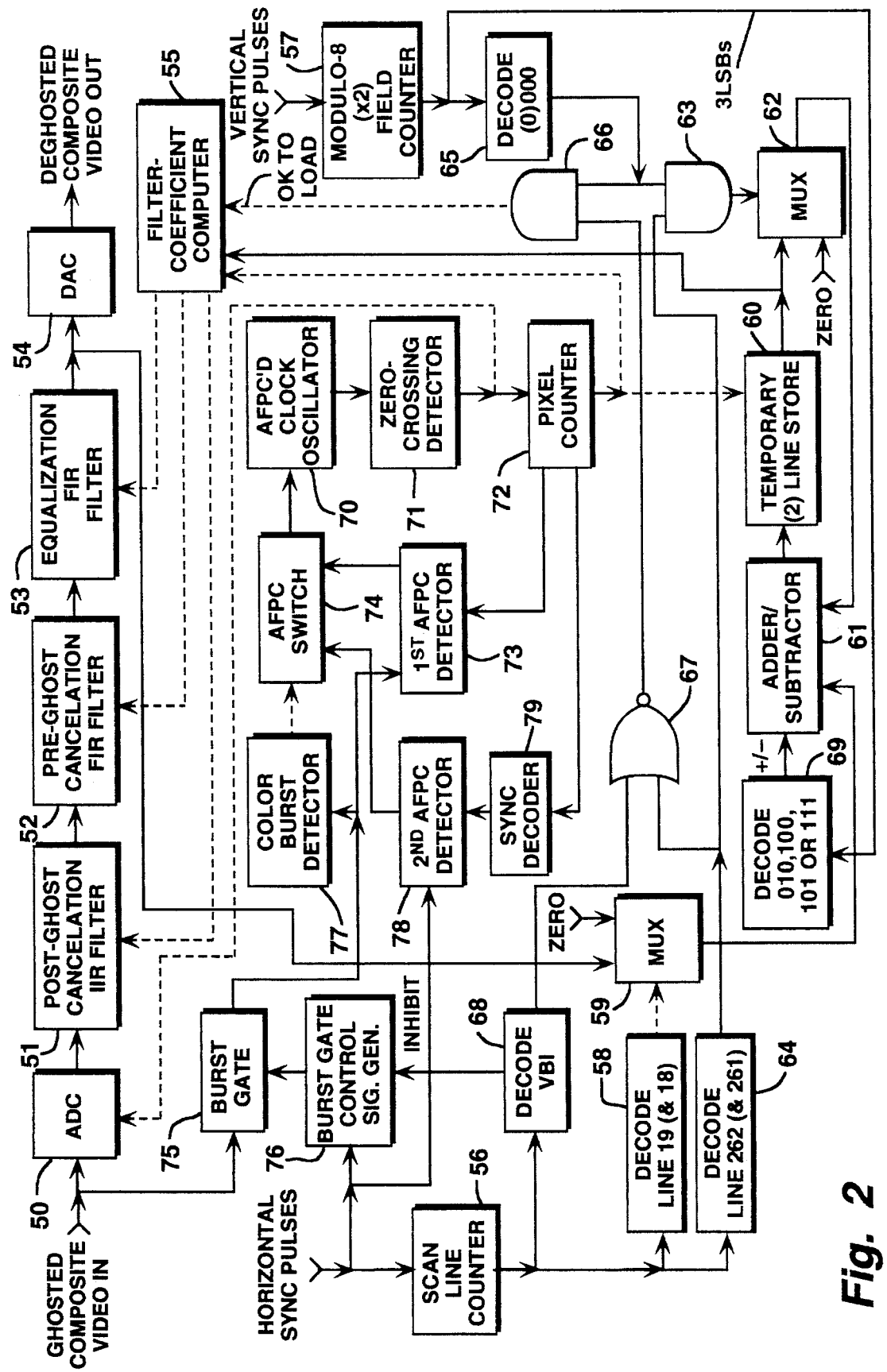
FIG. 2 is a schematic diagram of ghost-suppression circuitry suitable for inclusion in the FIG. 1 combination, which ghost-suppression circuitry includes GCR signal acquisition circuitry in accordance with one embodiment of the invention.
Figure 5:
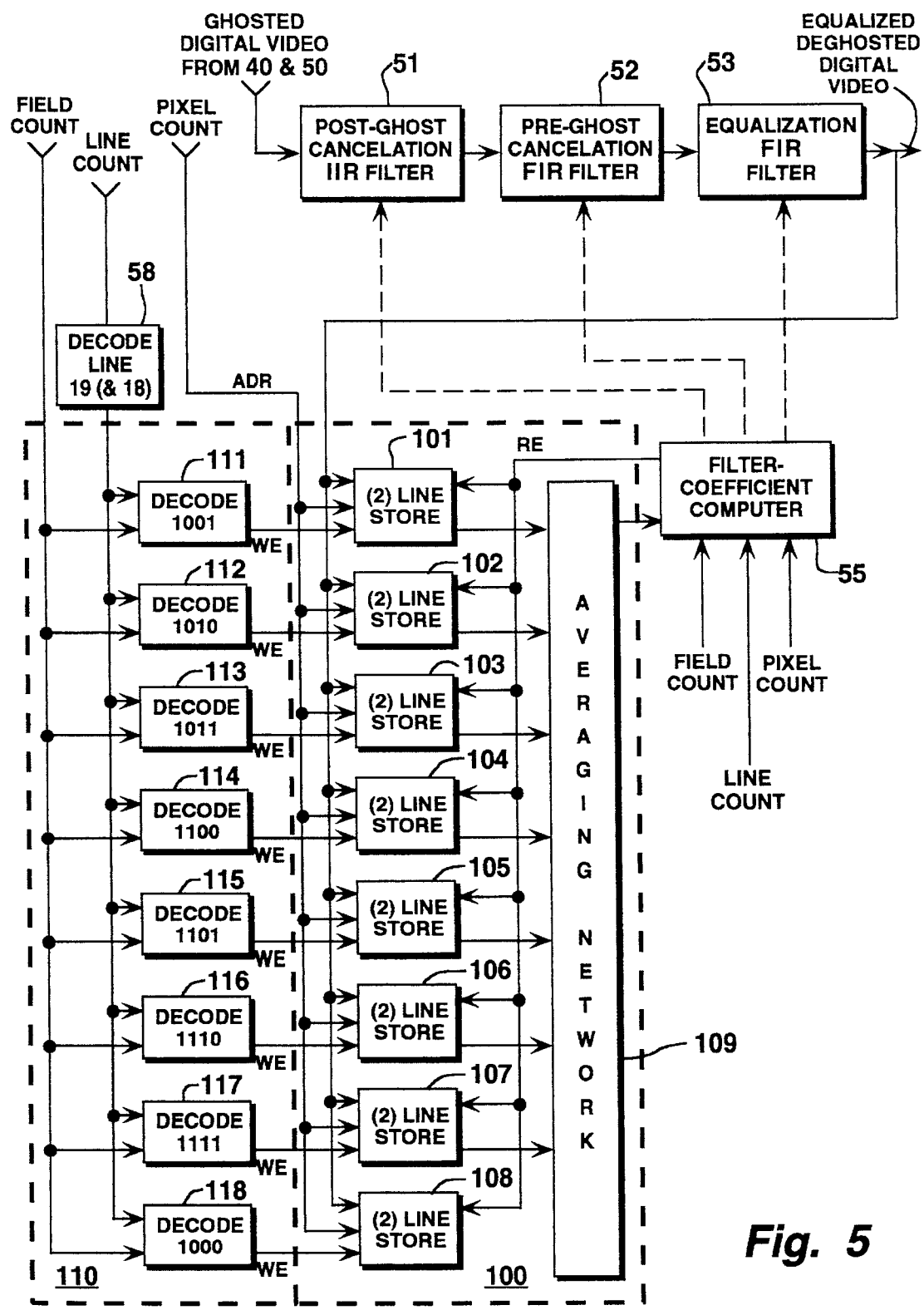
FIG. 5 is a schematic diagram of alternative GCR signal acquisition circuitry that can be used in the FIG. 2 ghost-suppression circuitry in another embodiment of the invention.

Various modifications that, in other embodiments of the invention, are made to the embodiments of the invention shown in FIGS. 2, 3 and 5 are noted within parentheses in those figures.

DETAILED DESCRIPTION OF PREFERRED EMBODIMENTS

The term "television set" is used in this specification to describe a television receiver front end with accompanying kinescope, power supply for a kinescope, deflection circuitry for a kinescope, portions of a television receiver associated with converting the composite video signal to the color signals for driving a kinescope, loudspeaker(s), stereophonic sound detector or audio ampliation circuitry. The conventional video cassette recorder (VCR) includes a television receiver front end without those accompanying further items, which are termed a "television monitor" in this specification and the accompanying drawing. If in a VCR and TV-set combined into a single piece of apparatus called a "combo" one desires the capability simultaneously to record a program received on one channel and to display a program received on a different channel, two TV receiver front ends have to be provided, one for the video tape machine with recording capability and one for the television receiver with image displaying capability. The above-referenced U.S. patent application Ser. No. 07/955,016 teaches that it is preferable to include respective sets of ghost-cancelation circuits after the video detectors of each of these TV receiver front ends, although one microcomputer can be used for calculating the filtering parameters for both sets of ghost-cancelation circuits.

Raster-scanning maps the two-dimensional spatial domains of successive image fields, which form a three-dimensional domain in space and time, into the one-dimensional time domain of a video signal. Television engineers refer to filter networks that combine various sample values of the video signal by names suggestive of the results of such combining in the three-dimensional domain in space and time. A filter network combining the sample values of the video signal which describe picture elements or "pixels" arrayed along the scan line of an image field is referred to as a "horizontal spatial filter". A filter network combining the sample values of the video signal separated in time by scan line intervals, which samples describe pixels that are arrayed transversely to the scan lines of an image field, is referred to as a "vertical spatial filter". A filter network combining the values of samples of the video signal separated in time by scan line intervals, which samples describe pixels that appear in the same position in successive image fields or frames, is referred to as a "temporal filter"—i.e., a filter that operates in the time dimension rather than either of the spatial dimensions. A temporal filter may combine pixels for only one position in space, but commonly combines correspondingly-located pixels from a plurality of frames for each of several positions in space. e.g., in a line-averaging filter correspondingly-located pixels are averaged for each of the positions along a scan line. By analogy, as used in this specification or the claims which follow, the term "temporal filter" is to be understood to include filters for combining corresponding "pixels" of respective scan lines selected from consecutive fields which scan lines include GCR signals. This particular type of temporal filter is referred to as a "GCR-signal-averaging filter" in this specification and the claims which follow, although averaging is not done on an actual-value basis, but only after correcting to a standard polarity of chirp.

Memories providing temporary storage of a number of samples corresponding to pixel positions in a scan line of video signal are referred to in this specification as "temporary 1-line stores" even though such stores may in fact be included in accumulators that accumulate several lines on a pixel-by-pixel basis. Similarly, memories providing temporary storage of a number of samples corresponding to pixel positions in two consecutive scan lines of video signal are referred to in this specification as "temporary 2-line stores" even though such stores may in fact be included in accumulators that accumulate several pairs of consecutive lines on a pixel-by-pixel basis. The inclusion of several temporary 1-line stores or temporary 2-line stores within a single banked memory is, of course, within the scope of the invention disclosed in this specification and its accompanying drawing.

A television receiver front end 20, in response to a radio-frequency television signal received thereby, supplies a sound signal and a composite video signal to apparatus 10, which apparatus 10 may be a television monitor or may be a video tape machine receiving these signals for recording. The video tape machine having recording capability may be a video cassette recorder (VCR) of VHS, super-VHS or Betamax type. By way of further example, the video tape machine may be an improved VHS recorder of the type described in U.S. Pat. No. 5,113,262 issued 12 May 1992 to C. H. Strolle et alii and entitled "VIDEO SIGNAL RECORDING SYSTEM ENABLING LIMITED BANDWIDTH RECORDING AND PLAYBACK".

The radio-frequency television signal may be broadcast over the air and then captured by an aerial television antenna 30 for application to the television receiver front end 20, as shown by way of example. Alternatively, the radio-frequency television signal can be provided over cable by community-antenna or other television cable service. The television receiver front end 20 includes the portions of a conventional television receiver normally employed in combination, either with a television monitor for displaying the video image, or with a video tape machine having recording capability. These portions generally include a radio-frequency amplifier, a down converter or "first detector", at least one intermediate-frequency amplifier, a video detector or "second detector", and a sound demodulator (frequently of intercarrier type). The television receiver front end 20 further includes separation circuitry for horizontal synchronizing pulses and for vertical synchronizing pulses.

The sound signal from the sound demodulator in the television receiver front end 20 is demodulated from a frequency-modulated sound carrier, as heterodyned to intermediate frequency by the down converter. Before its demodulation the frequency-modulated sound carrier is limited to remove amplitude variations therein, and the capture phenomenon suppresses responses to ghosts in the sound signal from the sound demodulator. Accordingly, the sound signal from the sound demodulator in the television receiver front end 20 is supplied directly to the apparatus 10, there to be utilized in the conventional manner.

The composite video signal from the video detector in the television receiver front end 20 is supplied to ghost-suppression circuitry 40 to have the accompanying ghosts removed or suppressed. The ghost-suppression circuitry 40, which can be any one of the types known to the art, includes adaptive filter circuitry and a computer for calculating the filter parameters for that adaptive filter circuitry. The resulting "deghosted" composite video signal is supplied from the ghost-suppression circuitry 40 to the apparatus 10, there to be utilized in the conventional manner. A GCR-signal separator (or GCR-signal acquisition circuitry) 45 selects a GCR signal and attendant ghosted replicas thereof from the composite video signal from the video detector in the television receiver front end 20. The GCR-signal separator 45 supplies the ghosted GCR signal it separates to the computer in the ghost-suppression circuitry 40, in which computer the ghosted GCR signal is correlated with a priori information concerning a ghost-free GCR signal as a basis for calculating the filter parameters for the adaptive filter circuitry in the ghost-suppression circuitry 40. In the invention the GCR-signal separator 45 takes the form of GCR-signal acquisition circuitry that averages on a pixel-by-pixel basis the Bessel chirps as extracted from the GCR signals in a number of consecutive fields. The GCR signals including ETP chirps form a first set of GCR signals, and the GCR signals including ETR chirps form a second set of GCR signals.

Rapidly changing multipath conditions occur at times— such as when one or more aircraft fly over the television receiver antenna 30, for example, causing fast-changing selective fading referred to as "aircraft flutter". The filter-coefficient computer within the ghost-suppression circuitry 40 generally is one with sufficient speed to compute updated filter parameters within a field time. However, the multipath conditions may change so rapidly during aircraft flutter, that updated filter parameters calculated just from one ghosted GCR signal selected from the $19^{th}$ line of a field are no longer appropriate at the later time in the field when the calculations of those filter parameters are completed. When in accordance with the invention noise-reduced GCR signals are generated by averaging the GCR signals from several consecutive fields, the calculation of updated filter parameters is even less able to track the rapidly changing multipath conditions. Accordingly, currently, it is most practical to determine the filter parameters for the ghost-suppression circuitry 40 only after the rapidly changing multipath conditions have passed and static multipath conditions are re-established.

There is also a need to take into consideration the fact that a television broadcaster is likely to transmit a television signal originating at different times from different sources of video signals. So, at times, discontinuities will occur in the field rate of the television signal, and two consecutive GCR signals may be either more than or less than a field apart. The averaging of the $19^{th}$ scan lines, so as to separate GCR signals from their pedestals and reduce noise, will proceed properly only over time intervals free from such discontinuities.

FIG. 2 illustrates one form the ghost-suppression circuitry 40 can take, which is suited for use with the Bessel-chirp GCR signals being inserted into the $19^{th}$ VBI lines of each field. Composite video signal, supplied to the FIG. 2 ghost-suppression circuitry from the television receiver front end 20, is digitized by an analog-to-digital converter 50. The ADC 50 typically will supply eight-parallel-bit samples of digitized composite video signal. The digitized composite video signal is applied as input signal to a cascade connection of a post-ghost cancelation filter 51, which is an adaptive filter of IIR type; a pre-ghost cancelation filter 52, which is an adaptive filter of FIR type; and an equalization filter 53, which is an adaptive filter of FIR type.

The output signal of the filter cascade is a digital deghosted composite video signal, which is converted to an analog deghosted composite video signal by a digital-to-analog converter 54. The analog deghosted composite video signal is supplied to the apparatus 10. The digital-to-analog converter 54 is dispensed with in advanced designs where the apparatus 10 is of a type utilizing digital, rather than analog signals.

A filter-coefficient computer 55 computes the weighting coefficients for the adaptive filters 51, 52 and 53. These weighting coefficients are binary numbers, which the filter-coefficient computer 55 writes into registers within the digital filters 51, 52 and 53. In the IIR filter 51 the weighting coefficients stored in registers thereof are used as multiplier signals for digital multipliers receiving the filter output signal with various amounts of delay as multiplicand signals. The product signals from the digital multipliers are combined algebraically in digital adder/subtractor circuitry to generate the IIR filter response. In each of the FIR filters 52 and 53 the weighting coefficients stored in registers thereof are used as multiplier signals for digital multipliers receiving the filter input signal with various amounts of delay as multiplicand signals. In each of the FIR filters 52 and 53 the product signals from the digital multipliers are combined algebraically in digital adder/subtractor circuitry to generate the weighted summation response characteristic of an FIR filter.

Pre-ghosts occurring in off-the-air reception can be displaced as much as 6 microseconds from the direct signal, but typically displacements are no longer than 2 microseconds. In cable reception direct off-the-air pick-up can precede the cable-supplied signal by as much as 30 microseconds. The number of taps in the FIR filters 52 and 53 depends on the range over which ghost suppression is sought. To keep filter costs within commercial constraints, typically the FIR filter 52 has around 64 taps for suppressing ghosts with as much as 6 microseconds displacement from the direct signal. The FIR filter 53 used for frequency equalization need only have 32 taps or so. The FIR filter 53 is typically required to correct in-band video response that can be rolled off by as much as 20 dB at 3.6 MHz, but roll-off at 3.6 MHz is usually less than 10 dB. The roll-off is usually attributable to incorrect orientation of the antenna In off-the-air reception. The cascaded FIR filters 52 and 53 are replaced in some designs by a single FIR filter having about 80 taps.

Typically, the range for post-ghosts extends to 40 microseconds displacement from the direct signal, with 70% or so of post-ghosts occurring in a subrange that extends to 10 microseconds. The IIR post-ghost cancelation filter 51 required for suppressing post-ghosts over the full range can be as many as 600 taps long. However, since post-ghosts usually are non-overlapping and occur at discrete displacements, the weighting coefficients for many of these taps of the filter 51 are zero-valued or nearly so. The taps requiring weighting coefficients of value significantly more than zero are clumped together in groups of ten or less except where there are overlapping ghosts. It is desirable, from the standpoint of economy of hardware, to use only as many digital multipliers as there are expected to be weighting coefficients of value significantly more than zero. Accordingly, the tapped delay line in the IIR filter 51 is usually designed as a cascade connection of ten-tap-or-so delay lines interspersed with programmable "bulk" delay devices, making filter 51 what is sometimes termed a "sparse-weighting" filter. The ten-tap-or-so delay lines furnish signals to the digital multipliers for weighting. The incremental delay between successive taps of each of these ten-tap-or-so delay lines is a single pixel interval. The programmable bulk delay devices each comprise various length delay lines the chaining together of which can be controlled in response to control signals expressed as binary numbers. Such a sparse-weighting filter will include registers for the binary numbers specifying the delays of the programmable delay devices, the contents of which registers are also controlled by the filter-coefficient computer 55.

Consider now the means by which the filter-coefficient computer 55 is supplied ghosted GCR signals from the television receiver front end 20. Horizontal and vertical synchronizing pulses are received from the front end 20. The horizontal sync pulses are counted by a nine-stage digital counter 56, denominated "scan line counter", periodically reset by vertical sync pulses; and the vertical sync pulses are counted modulo-8 by a three-stage digital counter, counter 57, denominated "field counter". These counts are available to the filter-coefficient computer 55 for use in timing its operations, although connections for furnishing these counts to the computer 55 are left out of FIG. 2 to reduce its complexity. A decoder 58 responds to the scan line count from the line counter 56 being nineteen, corresponding to the scan line in each field containing GCR signal, to condition the output signal of a multiplexer 59 to correspond to the digitized composite video signal from the output of the cascade connection of filters 51, 52 and 53 supplied as a first input signal thereto, rather than to a wired zero supplied as a zeroeth input signal thereto.

The filter-coefficient computer 55 has control over the operating parameters of the filters 51, 52 and 53. So, by manipulation of those operating parameters the computer 55 can select the point in the cascade connection of these filters 51–53 from which GCR signal is separated by the GCR signal separator. (The GCR signal separator comprises the elements 58 and 59 in FIG. 2 and the elements 58 and 101–108 in FIG. 5.) For example, the input signal applied to the cascade connection of the filters 51–53 can be selected to the GCR signal separator by the computer 55 by setting the weighting coefficients of the recursive paths in the IIR filter 51 to zero values, so the output response of the IIR filter 51 is determined solely by its input signal; by setting to zero all the weighting coefficients except a unity-valued one defining the kernel center in the FIR filter 52; and by setting to zero all the weighting coefficients except a unity-valued one defining the kernel center in the FIR filter 53. Alternatively, one can make circuit arrangements that will implement more direct and faster selection of the point in the cascade connection of the filters 51–53 from which GCR signal is separated. The fact that the point in the cascade connection of the filters 51–53 from which GCR signal is separated can be selected is important to understand, since this fact will aid in understanding the implementation of the procedure for calculating the variable parameters of the filters 51–53, which is explained further on in this specification with reference to the FIG. 4 flow chart.

A random-access memory with read-then-write capability provides a temporary (scan) line store 60 in FIG. 2, which store 60 may be replaced by serial memory in alternative embodiments of the ghost-suppression circuitry. This temporary line store 60 is connected in an arrangement for accumulating the $19^{th}$-VBI-line GCR signals on a per pixel basis for eight successive fields, in a temporal filtering operation that separates the Bessel-chirp information from other information occurring during those $19^{th}$ VBI scan lines. Elements 59–69 in the FIG. 2 circuitry combine to form a GCR-signal averaging filter that carries out this temporal filtering operation, which correlates the Bessel-chirp information occurring during those $19^{th}$ VBI scan lines to provide improved signal-to-noise ratio, as compared to using gating simply to separate the Bessel-chirp information from $19^{th}$ VBI scan lines as it occurs. When the corresponding pixels of the eight GCR signals have been accumulated during the $19^{th}$ line of FIELD 000, the eighth and last field of the eight-field sequence, the separated Bessel-chirp information is serially loaded one pixel at a time into a register of the filter-coefficient computer 55 during any line of FIELD 000 after its $19^{th}$ and before the line store 60 is cleared of data. In FIG. 2 the line store 60 is cleared of data during the last line of the last field of the eight-field sequence, but this clearance can take place during any line of FIELD 000 after the separated Bessel-chirp information is written into a register of the filter-coefficient computer 55. The transfer of accumulated data from the line store 60 to the computer 55 and the subsequent clearing of the accumulated data from the line store 60 can also take place during any two of the 1st through $18^{th}$ scan lines of FIELD 001.

More particularly, the temporary line store 60 has to have the capability of storing a full scan line of sixteen-parallel-bit samples, assuming that it is to accumulate on a signed basis eight lines of eight-parallel-bit samples of digitized composite video signal supplied from the ADC 50 via the cascaded filters 51–53. The signed arithmetic is preferably two's complement arithmetic. In partial implementation of the arrangement for operating the temporary line store 60 as a signed accumulator for GCR signals, a digital adder/subtractor 61 supplies a sixteen-parallel-bit output signal to the temporary line store 60 as its write input signal. The digital adder/subtractor 61 receives as a first input thereto the output signal of a multiplexer 62, which normally corresponds to the readout from the temporary line store 60 received as the zeroeth input of the multiplexer 62. The digital adder/subtractor 61 receives as a second input thereto the eight-parallel-bit output signal of the multiplexer 59 together with eight wired ZEROs as a sign-bit extension.

A decoder 69 decodes the modulo-eight field count being one, three, six, or zero (i.e., eight) to furnish a logic ZERO to the digital adder/subtractor 61 to condition it to add its input signals. The decoder 69 decodes the modulo-eight field count being two, four, five, or seven to furnish a logic ONE to the digital adder/subtractor 61 to condition it subtract its second input signal (supplied from the multiplexer 59) from its first input signal (supplied from the multiplexer 62). This arrangement accumulates in the temporary line store 60 the following function:

---

(FIELD 001 line 19) − (FIELD 010 line 19) +
(FIELD 011 line 19) − (FIELD 100 line 19) −
(FIELD 101 line 19) + (FIELD 110 line 19) −
(FIELD 111 line 19) + (FIELD 000 line 19).

---

During the last line of the eighth field of each sequence of eight fields, the normally ZERO control signal to the multiplexer 62 is caused to be a ONE. This ONE conditions the multiplexer 62 to furnish an output signal corresponding to a first input thereto, which is an arithmetic zero comprising sixteen parallel bits of wired ZEROs. This results in the resetting of the accumulation result in the temporary line store 60 to arithmetic zero. The control signal for the multiplexer 62 is shown in FIG. 2 as being generated by a two-input AND gate 63. A decoder 64 decodes the count from the scan line counter 56 corresponding to the last line of the current field to generate one of the input signals to the AND gate 63. A decoder 65 decodes the modulo-eight field count from the counter 57 to generate the other of the input signals to the AND gate 63. The eighth field of each sequence of eight fields generates a 000 modulo-eight count from the field counter 57. Both the input signals to the AND gate 63 are ONE only during the last line of the eighth field of each sequence of eight fields, during which line the AND gate 63 supplies a ONE to the multiplexer 62 as its control signal, causing the accumulation result stored in the temporary line store 60 to be reset to arithmetic zero.

A two-input AND gate 66 supplies a ONE to the filter-coefficient computer 55 when the accumulation result stored in the temporary line store 60 is available for transfer into a ghosted Bessel-chirp register within the internal memory of the computer 55. The output signal of the decoder 65 is one of the input signals to the AND gate 66 and is ONE only during the eighth field of each sequence of eight fields. A two-input NOR gate 67 generates the other of the input signals to the AND gate 66. The NOR gate 67 responds to the output signal of the decoder 64, which detects the last line of a field in the count from line counter 56, and to the output signal of a decoder 68, which detects the vertical blanking interval proceeding from the count from line counter 56. Accordingly, the NOR gate 67 output signal is ONE except during the vertical blanking interval or during the last line of a field. So, the accumulation result stored in the temporary line store 60 is available for transfer into the internal memory of the computer 55 any time during the eighth field of each sequence of eight fields except during its last line or during vertical blanking interval.

The clocking for timing pixel sampling by the analog-to-digital converter 50 and the addressing of the temporary line store 60 will now be considered. An oscillator 70 that has automatic frequency and phase control (AFPC) generates sinusoidal oscillations at the second harmonic of color subcarrier frequency as a primary clocking signal. A zero-crossing detector 71 detects average axis crossings of the sinusoidal oscillations to generate pulses at a rate four times color subcarrier frequency. These pulses time the sampling of the composite video signal for digitization by the ADC 50; and they would time the advance of data in the temporary line store 60 if it were a serial memory. In the FIG. 2 ghost-suppression circuitry the temporary line store 60 is a random-access memory arranged for read-then-write operation as each of its storage locations is addressed. The addresses of its storage locations are recurrently scanned in accordance with the count of pixels supplied from a ten-stage digital counter 72 denominated as "pixel counter", which counts the pulses from the zero-crossing detector 71. These same addresses are supplied to the filter-coefficient computer 55 to be used to address a line storage register therein when separated GCR signal is transferred thereto from the temporary line store 60.

Generally if it exists, the color burst signal is the most stable frequency reference in a composite video signal and is the preferred reference signal for AFPC of the oscillator 70. The overflow signal from the second stage of the pixel counter 72 is presumably a 3.58 MHz square wave and is supplied as a feedback signal to a first AFPC detector 73 for comparison to a separated burst signal, in order to generate an error signal an AFPC signal multiplexer 74 selectively applies to the pixel counter 72 for controlling the frequency and phase of its oscillations. A burst gate 75 responds to pulses from a burst gate control signal generator 76 to separate from the analog composite video signal supplied from the TV receiver front end 20 a color burst signal to be supplied to the first AFPC detector 73. The horizontal sync pulses from the television receiver front end 20 are supplied to the burst gate control signal generator 76 and their trailing edges are used to time the pulses that the generator 76 generates during color burst intervals. A cascade of astable flip-flops or "one-shots" are customarily employed in the generation of these pulses.

The decoder circuitry 68 responds to the scan line counts that the line counter 56 provides which correspond to the VBI lines in each field to generate an inhibitory signal. This inhibitory signal is applied to the burst gate control signal generator 76 to inhibit its generating pulses, so that the burst gate 75 will select only those backporch intervals during a field which can have color burst. (In a variant embodiment the burst gate control signal generator 76 is not inhibited from generating burst gate pulses during the vertical blanking interval and the time constant of the first AFPC detector is made longer than necessary in the FIG. 2 circuitry.)

An amplitude detector 77 denominated the "color burst presence detector" detects when burst is present in the output signal from the burst gate 75 to supply a ONE that conditions the AFPC signal multiplexer 74 to select the output signal from the first AFPC detector 73 as a first error signal, for application to the controlled oscillator 70 as its AFPC signal. Preferably, from the standpoint of immunity to noise, the amplitude detector 77 comprises a synchronous detector stage followed by a threshold detector stage followed by a short-pulse eliminator. Arrangements of the pixel counter 72 can be made for providing a pair of 3.58 MHz square waves in quadrature phase relationship with each other for application to the synchronous detection portions of the detectors 73 and 77. Arrangements of counters to provide square waves in quadrature phase relationship with each other are familiar to television circuit designers, being commonly used in television stereophonic sound decoders. Short-pulse eliminators are known from radar and are commonly constructed using circuitry for ANDing differentially delayed input signal thereto thereby to generate output signal therefrom.

When a black and white television signal without attendant color burst is received, the reference signal for AFPC of the oscillator 70 will have to be the separated horizontal sync pulses supplied to the AFPC circuitry from the TV receiver front end 20. The color burst presence detector 77 will supply a ZERO when the composite video signal supplied from the TV receiver front end 20 has no attendant color burst, conditioning the AFPC signal multiplexer 74 to select the output signal from a second AFPC detector 78 to controlled oscillator 70 as its AFPC signal. A sync decoder 79 responds with a ONE to the count(s) of the pixel counter 72 theoretically corresponding to the occurrence of the horizontal sync pulse or a prescribed portion thereof, such as an edge thereof. The output signal from the sync decoder 79 is supplied as feedback signal to the second AFPC detector 78, which compares that feedback pulse to an input reference signal taken from the horizontal sync pulses supplied from the horizontal sync separator in the TV receiver front end 20 and generates a second error signal for being selectively applied by the AFPC signal multiplexer 74 to controlled oscillator 70 as its AFPC signal. This AFPC arrangement is called "line-locked-clock" by television engineers.

Stability of the oscillations of the controlled oscillator 70 is required over the number of fields from which the $19^{th}$ scan lines are taken for accumulation in the temporary line store 60, in order that the accumulation procedure by which the Bessel chirp is separated from those lines adequately suppresses horizontal sync pulse, front porch, back porch including color burst and +30 IRE pedestal. Crystal control of the frequency of the oscillations is a practical necessity; and the automatic phase Control (APC) aspect of the AFPC should predominate, with the automatic frequency control (APC) aspect of the AFPC having a very long time constant—i.e., several fields long.

The circuits for resetting the counters 56, 57 and 72 are omitted from FIG. 2 to avoid undue complexity. The scan line counter 56 can be simply reset by the leading edges of vertical sync pulses supplied from the vertical sync separator in the TV receiver front end 20.

The pixel count from the pixel counter 72 is reset when necessary in order to re-synchronize it with the scan lines in the composite video signal supplied from the video detector of the TV receiver front end 20. The leading and trailing edges of the horizontal sync pulses supplied from the horizontal sync separator of the TV receiver front end 20 are detected, using a differentiator followed by a appropriate level comparators. The leading edge detector result is used to command the loading of a temporary storage register with the current pixel count. The pixel count is applied to a window comparator to determine if it is within its expected range and to generate an indication of error if it is not. The count of the pixel counter 72 is conditionally reset to zero responsive to the trailing edge detector result. The condition for reset may be a single indication of pixel count error. However, better noise immunity is obtained by counting the errors in an up/down counter configured so a given number of consecutive errors must be counted before pixel count is corrected.

FIG. 3 shows circuitry for resetting the modulo-eight field counter 57 so its count either is correctly phased or is misphased by four fields. The temporary line store 31 is shown as being a random-access memory addressed by the pixel count supplied from the pixel counter 72. The line store 31 is arranged for read-then-write operation. The logic ONE issued by the decoder 58 only during the $19^{th}$ scan line of each field is furnished to a multiplexer 310 to condition the updating of the temporary line store 31 with digitized $19^{th}$ scan line samples supplied from the ADC 50. During other scan lines the logic ZERO issued by the decoder 58 conditions the multiplexer 310 to apply the data read from the temporary line store 31 for writing back thereinto.

The temporary line store 31 is provided with pixel latches 32 and 33 clocked by the output signal from the zero-crossing detector 71. The pixel latches 32 and 33 are used for temporarily storing the last pixel written into the temporary line store 31 and the last pixel read out of the temporary line store 31, respectively, aligning those samples in time to be respective ones of the subtrahend and minuend input signals of a digital subtractor 34. The pixel samples of the difference signal from the subtractor 34 will all be zero valued except during $19^{th}$ scan lines. The difference signal from the subtractor 34 is furnished to an absolute-value circuit 35, which can comprise a battery of two-input exclusive-OR gates each receiving the sign bit of the difference signal as a first input and receiving a respective other bit of the difference signal for selectively complementing, and which can then further comprise a digital adder for adding the sign bit of the difference signal to the selectively complemented remaining bits of the difference signal to generate as a sum output signal the absolute value of the difference signal.

An accumulator 36 for successive samples of the absolute-value circuit 35 output signal includes an output latch 361 for temporarily storing successive values of the accumulation result, a digital adder 362 for adding the successive samples of the output signal of the absolute-value circuit 35 to the accumulation result to augment its value, and a multiplexer 363 for selectively supplying the augmented accumulation result to the output latch 361 for updating its contents. The multiplexer 363 is wired for inserting arithmetic zero into the output latch 361 whenever the decoder 58 does not detect the counter 56 supplying a scan line count of nineteen. A decoder 364 responds to the pixel count from the counter 72 being descriptive of those portions of a scan line as may contain Bessel chirp information to furnish a ONE, which is ANDed with the output signal from the zero-crossing detector 71 in an AND gate 365. The output latch 361 is clocked to receive input data responsive only to a ONE being received from the AND gate 365.

The successive samples of the absolute value of the difference of the nineteen lines of the current and previous fields, as supplied serially from the absolute-value circuit 35, are accumulated using the accumulator 36. The accumulation result should have appreciable value if the current field is not FIELD 001 or FIELD 101. The $19^{th}$ lines of FIELD 000 and of FIELD 001 both contain ETP signal, so their difference is zero-valued except for noise. The $19^{th}$ lines of FIELD 100 and of FIELD 101 both contain ETR signal, so their difference is zero-valued except for noise. The output signal of a threshold detector 37, which is a ONE when the accumulation result is substantially more than arithmetic zero and is otherwise a ZERO, is complemented by a NOT gate 38 to supply one of the four input signals of an AND gate 39. A decoder 41 detects the field count from the counter 57 being other than 001 or 101 to furnish a ONE to the AND gate, which ONE is indicative that the field count is misphased and enables the resetting of the counter 57. The output signal of the decoder 58, which detects the occurrence of the $19^{th}$ line of a field, and the output signal of a decoder 42, which responds to the pixel count from the counter 72 to detect the end of a scan line, are the other two input signals to the AND gate 39. Providing that the field count is not 001 or 101, the AND gate 39 generates a ONE to reset the counter 57 to 001 field count at the end of the $19^{th}$ line of a FIELD 000 or of a FIELD 100 in the television signal received by the TV receiver front end 20. Alternatively, the counter 57 could be reset to 101; or provision can be made for resetting only the two least significant bits of the field count, resetting them to 01.

Returning to FIG. 3, if the modulo-eight field count provided by the field counter 57 is correctly phased, the accumulation result attained in the temporary line store 60 during FIELD 000, the last field in the cycle of algebraic accumulation, will be eight times the ETP Bessel chirp signal, devoid of accompanying horizontal sync pulse, front porch, back porch including color burst and +30 IRE pedestal. On the other hand, if the modulo-eight field count provided by the field counter 57 is misphased by four fields, the accumulation result attained in the temporary line store 60 during FIELD 000, the last field in the cycle of accumulation will be eight times the ETR Bessel chirp signal devoid of accompanying horizontal sync pulse, front porch, back porch including color burst and +30 IRE pedestal. A wired three binary place shift in the direction towards reduced magnitude divides the accumulation results attained in the temporary line store 60 during FIELD 000 by eight, and the resulting quotients are supplied as the ETP or ETR signal to the filter-coefficient computer 55.

The filter-coefficient computer 55, which is well-adapted to performing correlations against a ghost-free Bessel chirp function ETP or ETR stored in an internal register thereof, is programmed to perform a correlation substep that determines whether the input it receives from the temporary line store 60 during FIELD 000 is ETP signal, is ETR signal, or is unrelated to the ETP or ETR signal. This procedure enables the filter-coefficient computer 55 to determine when no GCR signals are included in the television signal received by the TV receiver front end 20. The computer 55 may then apply predetermined "bypass-mode" weighting coefficients as stored in registers therewithin to the filters 51, 52 and 53, just as is done in the initial powering up of the ghost-suppression circuitry. Alternatively, the computer 55 may be arranged to compute weighting coefficients for the filters 51, 52 and 53 proceeding from data concerning received ghosts supplied by means that do not rely on GCR signals being included in the television signal received by the TV receiver front end 20.

In other variations of the FIG. 3 circuitry, circuitry external to the computer 55 is provided for analyzing the GCR signal stored in the temporary line store 31 (during the scan line following its acquisition, for example) to determine whether it is an ETP or ETR signal and this determination is used to determine whether the most significant bit of the reset condition for the field counter 57 is a ZERO so reset is to 001 field count or is a ONE so reset is to 101 field count. The contents of the temporary line store 31 are scanned in accordance with the pixel count from the counter 72 during the analysis procedure.

In an exemplary analysis procedure, the portions of the pixel count corresponding to the initial lobe of the Bessel chirp are decoded to selectively generate a ONE that is used to enable accumulation by either of two accumulators. One accumulator further requires that the sign bit of the current GCR signal be ZERO in order to accumulate its magnitude (absolute-value) in excess of a threshold value T. The other accumulator further requires that the sign bit of the current GCR signal be ONE in order to accumulate its magnitude (absolute-value) in excess of a threshold value T. After the portion of the pixel count corresponding to the initial lobe of the Bessel chirp is scanned, the magnitudes of the accumulator contents are each compared in respective comparators to a threshold value T that is almost as large as the integral of the absolute value of the initial lobe of the Bessel chirp. If the contents of the accumulator that requires that the sign bit of the current GCR signal be ZERO in order to accumulate exceeds this threshold T after the initial lobe of the Bessel chirp, the comparator associated with that accumulator furnishes a ONE to the filter-coefficient computer 55, which ONE together with a ZERO from the other comparator identifies the presence of an ETP signal. Conversely, if the contents of the accumulator that requires that the sign bit of the current GCR signal be ONE in order to accumulate exceeds this threshold T after the initial lobe of the Bessel chirp, the associated comparator furnishes a ONE to the computer 55, which ONE together with a ZERO from the other comparator identifies the presence of an ETR signal. If this threshold T is not exceeded by the contents of either of these accumulators after the initial lobe of the Bessel chirp, the two associated comparators both furnish ZEROs to the computer 55, which determines that neither an ETP nor an ETR signal exists in the television signal which the FIG. 2 apparatus is attempting to deghost. In further refinements of this scheme, the threshold value T is adjusted responsive to noise and GCR signal amplitude conditions.

Variations of the FIG. 2 ghost-suppression circuitry are possible wherein, when data is being transferred from the temporary line store 60 to a line storage register in the filter-coefficient computer 55, the addressing of the temporary line store 60 and of the line storage register being transferred to is generated within the computer 55, instead of by the pixel counter 72. A multiplexer under control of decoder 58 or of the computer 55 can apply addresses to the temporary line store 60, selecting them from the pixel counter 72 during the $19^{th}$ line of each field and otherwise selecting them from those provided by the computer 55. Variations of the FIG. 2 ghost-suppression circuitry are also possible wherein a plurality of temporary line stores are used, instead of a single temporary line store 60, enabling the computer 55 to update the coefficients of the filters 51, 52 and 53 more often than on an eight-field cycle.

Another modification that can be made to the FIG. 2 ghost-suppression circuitry is the accumulation in the temporary line store 60 of the $19^{th}$ scan lines from sixteen consecutive fields, rather than eight. This further correlates the separated Bessel chirp information, which significantly improves its signal-to-noise ratio as supplied to the filter-coefficient computer 55. In such variations of the FIG. 2 ghost-suppression circuitry the modulo-8 field counter 57 is replaced by a modulo-16 field counter and the decoder 65 is replaced by a decoder that generates a ONE when and only when FIELD COUNT from that modulo-16 field counter is 0000. The temporary 1-line store 60 will then accumulate GCR signals from sixteen consecutive fields, which can be divided by sixteen using a wired 4-binary-place shift to supply the computer 55 an updated reduced-noise GCR signal with attendant ghosts. Further accumulation—e.g., of the $19^{th}$ scan lines from 24 consecutive fields—provides little more improvement in the signal-to-noise ratio of the separated Bessel chirp information supplied to the filter-coefficient computer 55.

In further or still other variations of the FIG. 2 ghost-suppression circuitry the temporary single-scan-line store 60 is replaced by a temporary two-scan-line store and the decoder 58 is replaced by a decoder for detecting the presence of the $18^{th}$ or $19^{th}$ scan lines to supply ONEs for two consecutive scan lines to condition the multiplexer 59 for loading the temporary two-scan-line store. The decoder 64 is replaced by a decoder for detecting the presence of the 261st or 262nd scan lines to supply ONEs for two consecutive scan lines to the AND gate 63. The AND gate 63 responds to the ONEs during the 261st or 262nd scan lines of each field identified by an all-zero-bits FIELD COUNT to condition the multiplexer 62 to empty the contents from the temporary two-scan-line store. Or the temporary single-scan-line store 60 may be replaced by a temporary three-scan-line store and the decoder 58 may be replaced by a decoder for detecting the presence of the $18^{th}$ through $20^{th}$ scan lines to condition the multiplexer 59 for loading the temporary three-scan-line store, with suitable provisions for periodically erasing the 3-line store. These arrangements facilitate the pairwise combination of VBI intervals containing antiphase GCR signals and in-phase other reference signals, in order to suppress longer-delayed macroghosts.

From the standpoint of simplifying hardware, the decoder 64 of FIG. 2 is preferably replaced by any one of several simpler decoders each of which provides a ONE for one line or a pair of lines after the $19^{th}$ line, but before the 262nd line. For example, a decoder that detects a ONE in the eighth least significant bit of LINE COUNT may be used together with the decoder 65 to supply the two input signals of the AND gate 63. The AND gate 63 will then condition the multiplexer 62 to empty the contents of the temporary line store 60 on each of the scan lines after the 255th in the field identified by the FIELD COUNT that is zero in every binary place.

Figure 4:
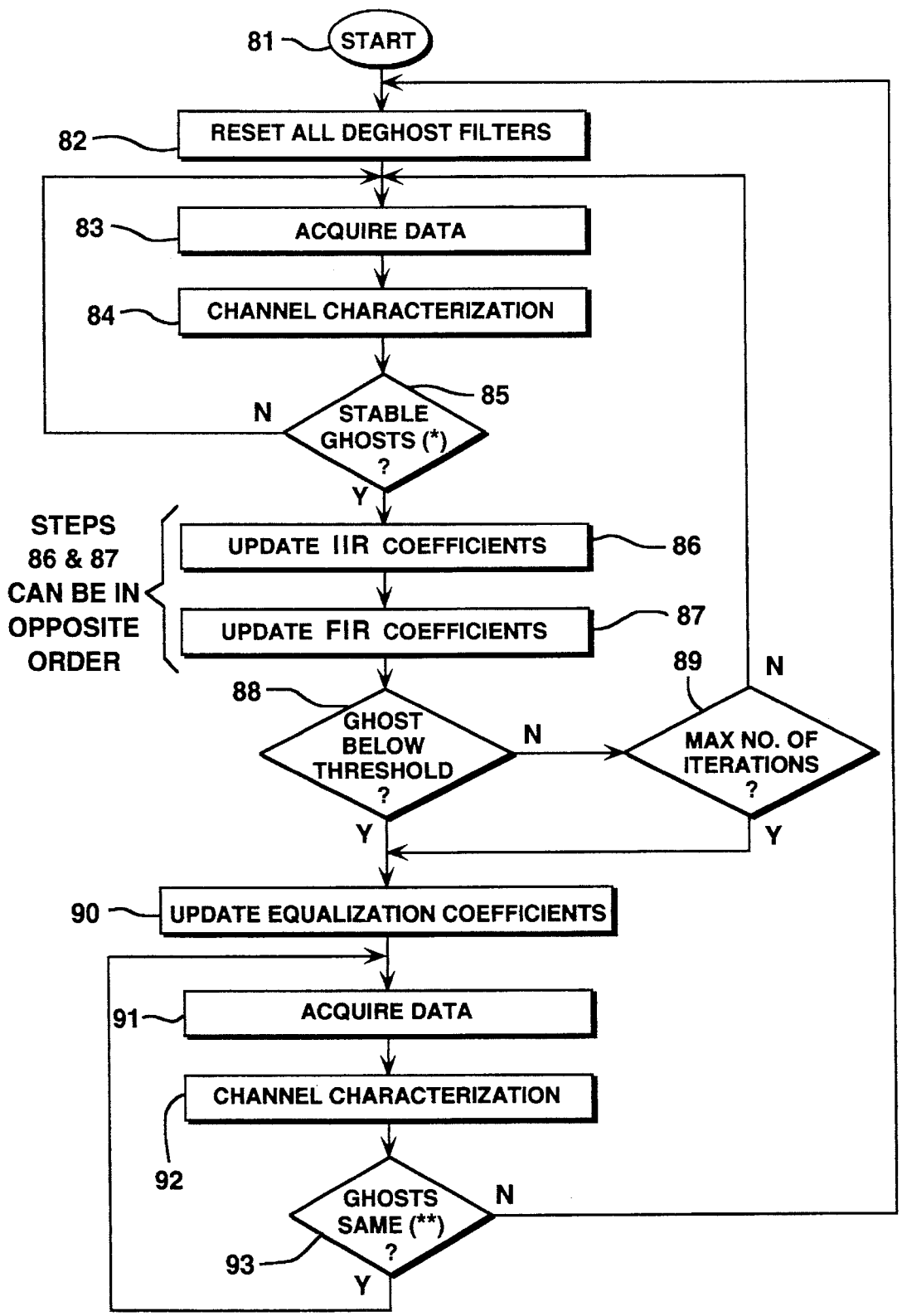
FIG. 4 is a flow diagram of a deghosting method used with the FIG. 2 deghosting circuitry.

FIG. 4 shows the flow diagram of a procedure for establishing the operating parameters of the filters 51, 52 and 53, which procedure is carried out by the filter-coefficient computer 55. Entry to the START condition 81 of the procedure is at the time power is turned on in the television receiver, when a new channel is tuned, or when a prescribed time has elapsed since the last deghosting procedure. A RESET ALL DEGHOST FILTERS step 82 preferably sets the filter coefficients in the filters 51, 52 and 53 to values previously determined for the channel to which the TV receiver front end 20 is tuned and stored in a channel-addressed memory. Alternatively, during power-up or retuning, the filter coefficients in the filters 51, 52 and 53 can be set to "bypass mode" values associated with a ghost-free signal; and during periodic deghosting previous values of the filter coefficients are retained during "reset".

An ACQUIRE DATA step 83 then follows, which step 83 is completed after the number of fields elapse that the computer 55 must wait for accumulation in the temporary line store 60 to be completed, in order to generate a separated GCR signal that is suitable input data for the computer 55. The ACQUIRE DATA step 83 includes a correlation substep not shown in FIG. 4 which substep determines whether the input the computer 55 receives from the temporary line store 60 during FIELD 000 is ETP signal, is ETR signal, or is unrelated to the ETP or ETR signal.

A CHANNEL CHARACTERIZATION step 84 then takes place. The computer 55 carries this out by correlating, in the time domain, the ghost-free GCR signal stored in its permanent memory with the ghosted GCR signal separated from the received composite video signal. The location in time of the predominant response in the data supplied the computer 55 is detected, then the respective location in time of each successively smaller one of the significantly large ghost responses, up to the number of post-ghosts that can be suppressed by the filter 51 and up to the number of pre-ghosts that can be suppressed by the filter 52. The respective locations in time of the predominant response and multipath responses in the data supplied the computer 55 are calculated and stored temporarily in the internal memory of the computer 55, to be used as the basis for programming the bulk delay lines interspersed between the clumps of taps in the IIR filter 51. The relative strengths of the predominant response and multipath responses in the data supplied to the computer 55 are calculated and stored temporarily in the internal memory of the computer 55, to be used as the basis for assigning weights to the clumped taps of IIR filter 51 and to the taps of FIR filter 52. The CHANNEL CHARACTERIZATION step 84 is carried forward in the filter coefficients computer 55 by taking the discrete Fourier transform (DFT) of the acquired GCR signal and dividing the terms of that DFT by the corresponding terms of the DFT of a ghost-free GCR signal, which latter DFT is known a priori and is stored in the internal memory of the computer 55. This term-by-term division procedure generates the DFT of the reception channel, which is temporarily stored in the internal memory of the computer 55.

As part of the CHANNEL CHARACTERIZATION step 84, it is preferable to normalize the terms of the DFT of the reception channel respective to the energy in the predominant image. The largest-magnitude term of the DFT of the reception channel is determined and the r-m-s energy of that term and its closeby surrounding terms (e.g., twelve on each side) is determined. Normalization could be done on the predominate image and all ghost images, but it is preferably from the standpoint of reducing calculations to discard low-energy ghosts before normalization, which is done as follows. The r-m-s energy of the largest-magnitude term of the DFT of the reception channel and its closeby terms, as is descriptive of the predominant image, is scaled down to provide a threshold level against which to compare the r-m-s energies of ghost images described by the other terms of the DFT of the reception channel, in order to determine whether each of those ghost images is or is not significantly large. A threshold level −30 dB down from the r-m-s energy of the predominant image has been found satisfactory. Each of the terms of the DFT of the reception channel that is descriptive of a ghost image having r-m-s energy lower than threshold level is simply replaced by a zero to generate an approximated DFT of the reception channel, to be normalized. In the normalization each of the non-zero terms in the approximated DFT is divided by the r-m-s energy of the predominant image. The normalized approximated DFT of the reception channel is temporarily stored in the internal memory of the computer 55, to be used to support the remaining portions of the calculations. The number of divisions that must be performed in this normalization procedure may be counted, or the number of terms lower than threshold level that are replaced by a zero may be counted as an aid to implementing a later decision step 88 in the FIG. 4 procedure.

Referring back to the FIG. 4 procedure, A STABLE GHOST? decision step 85 follows the CHANNEL CHARACTERIZATION step 84. This step is carried forward using a subroutine where the results of the CHANNEL CHARACTERIZATION step 84 just previous to the most recent CHANNEL CHARACTERIZATION step 84 are fetched from a register in the internal memory of the filter coefficients computer 55 and are replaced in that register by the results of the current CHANNEL CHARACTERIZATION step 84. The results of the most recent CHANNEL CHARACTERIZATION step 84 are cross-correlated with the results of the just-previous CHANNEL CHARACTERIZATION step 84 to determine whether the correlation is sufficiently good that the ghosting conditions can be considered stable, or unchanging. Only if the ghosting conditions are substantially unchanging is a Y(ES) signal generated indicating there a basis for going on further with the deghosting procedure using the most recent CHANNEL CHARACTERIZATION results. If the A STABLE GHOST? decision step 85 generates an N(O) signal indicative of changing ghost conditions, operation loops back to the ACQUIRE DATA step 83, and the adjustable filtering parameters of the IIR filter 51 and of the FIR filter 52 are left unchanged. If the STABLE GHOST? decision step 85 generates a Y(ES) signal, the procedure goes on to steps 86–88, which use the most recent CHANNEL CHARACTERIZATION step 84 results as the basis for updating the adjustable filtering parameters of the IIR filter 51 and of the FIR filter 52.

In the UPDATE IIR COEFFICIENTS step 86 the programmable delays and the non-zero weighting coefficients of the IIR filter 51 are updated, using the most recent CHANNEL CHARACTERIZATION step 84 results as the basis for the updating. More particularly, the post-ghost portion of the most recent normalized reception channel DFT results, those later in time than the largest-magnitude term, are complemented to generate the DFT of the desired IIR filter 51 response, from which DFT the updated IIR filter coefficients are taken. The non-zero terms of the DFT of the desired IIR filter 51 response are used to determine weighting coefficients. The lengths of intervals containing all zero coefficients are measured to determine the adjustable delay of bulk delay devices if the IIR filter 51 is of a sparse coefficient type. The updated IIR filter parameters are applied to the IIR filter 51.

An UPDATE FIR COEFFICIENTS step 87 is performed after the UPDATE IIR COEFFICIENTS step 86. The non-zero weighting coefficients of the FIR filter 52 are updated, using the most recent CHANNEL CHARACTERIZATION step 84 results as the basis for the updating. More particularly, the pre-ghost portion of the most recent normalized reception channel DFT results, those earlier in time than the largest-magnitude term, are complemented to generate the DFT of the desired FIR filter 52 response, from which DFT the updated FIR filter coefficients are taken. The lengths of intervals containing all zero coefficients are measured to determine the adjustable delay of bulk delay devices if the FIR filter 52 is of a sparse coefficient type. The updated FIR filter coefficients are applied to the IIR filter 52.

FIG. 4 shows a decision step 88 of GHOSTS BELOW THRESHOLD? being reached after the UPDATE IIR COEFFICIENTS and UPDATE FIR COEFFICIENTS steps 86 and 87 are performed. The step 88 may be implemented proceeding from the count of the number of divisions performed when normalizing the reception channel DFT in the CHANNEL CHARACTERIZATION step 84, the count being zero generating a Y(ES) signal and the count being other than zero generating a N(O) signal. Alternatively, the step 88 may be implemented proceeding from the count of the number of terms lower than threshold level that are replaced by a zero when normalizing the reception channel DFT in the CHANNEL CHARACTERIZATION step 84, the count being one less than the total number of reception channel DFT terms generating a Y(ES) signal, and other counts generating a N(O) signal.

An N(O) signal resulting from the GHOSTS BELOW THRESHOLD? step 88 directs the operation to a MAXIMUM NUMBER OF ITERATIONS STEP 89. A counter in the computer counts the number of N(O) signals resulting from the GHOSTS BELOW THRESHOLD? decision step 88 and is reset to zero count by a Y(ES) signal resulting from the GHOSTS BELOW THRESHOLD? step 88. An N(O) signal resulting from the GHOSTS BELOW THRESHOLD? step 88 before maximum count is reached by this counter loops operation back to the ACQUIRE DATA step 83.

If the decision in step 88 is Y(ES), all significant ghosts have been canceled, or, if the decision in step 89 is Y(ES), indicating that sufficient iterations have been made that there is assurance that the filters 51 and 52 do not have the capability to be further adjusted to cancel at least one more ghost, the part of the procedure having to do with cancelling macroghosts is done and the procedure goes on to an UPDATE EQUALIZATION COEFFICIENTS step 90 in which weighting coefficients for the amplitude-equalization filter 53 are calculated.

The UPDATE EQUALIZATION COEFFICIENTS step 90 can be performed by taking the DFT of the response of the cascade connection of the filters 51 and 52 to just the Bessel chirp portion of the ghosted GCR signal as separated from the rest of that signal by a windowing procedure, which DFT has non-zero terms only closeby its largest-magnitude term. That DFT is divided term by term into the DFT of the ideal response to a ghost-free windowed Bessel chirp as stored in the memory of the computer 55, thereby to obtain the basis for calculating the adjustments necessary in the tap weights of the FIR filter 53, used to counter the effects of microghosts. The bin width of the DFT terms can be the same as the bin width of the DFT terms involved in the calculations of the adjustable filtering parameters of the filters 51 and 52 used to suppress macroghosts. The number of taps for the FIR filter 53 is typically no more than thirty-two, however, so the number of spectral bins in the truncated DFT is reasonably small and the time required to do these calculations is not unreasonably lengthy. The division procedures in these methods of performing equalization are prone to error when division is by small numbers, and there is some need for limiting the upward range of quotients.

A preferable alternative way to calculate equalization filter coefficients is to use an iterative least-means-squares-error method to adjust the filter 53 weighting coefficients so that the response of the cascade connection of filters 51–53 accumulated in the temporary line store 60 best fits an ideal response to a ghost-free GCR Bessel chirp, as stored in the memory of the computer 55. The ideal response to a ghost-free GCR Bessel chirp could have a (sin x)/x envelope in the time domain, descriptive of a flat response in the frequency domain. However, usually a subjectively more pleasing video image is one which has some high-frequency peaking to improve transient response; so the ideal response to a ghost-free GCR Bessel chirp stored in the memory of the computer 55 for use in equalization may preferably be one having appropriate high-frequency peaking.

Following the UPDATE EQUALIZATION COEFFICIENTS step 90, another ACQUIRE DATA step 91 follows in the FIG. 4 procedure, which step 91 is completed after the number of fields elapse that the computer 55 must wait for accumulation in the temporary line store 60 to be completed, in order to generate a separated GCR signal that is suitable input data for the computer 55. The ACQUIRE DATA step 91 includes a correlation substep not shown in FIG. 4 which substep determines whether the input the computer 55 receives from the temporary line store 60 during FIELD 000 is ETP signal, is ETR signal, or is unrelated to the ETP or ETR signal.

Another CHANNEL CHARACTERIZATION step 92 then takes place, using any ETP or ETR signal acquired in the step 91 to recalculate the DFT of the reception channel. In a GHOSTS SAME? decision step 93 the DFT of the reception channel recalculated in the CHANNEL CHARACTERIZATION step 92 is correlated with the DFT of the reception channel as previously calculated in the CHANNEL CHARACTERIZATION step 84. From the standpoint of easy implementation, the correlation is preferably done in an indirect manner by checking to see if the residual ghosts in both the CHANNEL CHARACTERIZATION step 84 and the CHANNEL CHARACTERIZATION step 93 are all below prescribed threshold level. If the correlation is good, indicating that ghosting has not changed appreciably, the decision step 93 generates a Y(ES) signal that loops operation back to the ACQUIRE DATA step 91, to continue checking to find out whether or not ghosting has changed appreciably. The filtering parameters of the filters 51–53 are left unchanged.

If the correlation is poor, indicating that ghosting has changed, the decision step 93 generates a N(O) signal that loops operation back to the RESET ALL DEGHOST FILTERS step 82. This procedure disables ghost suppression when rapidly changing multipath conditions occur or when a different reception channel is selected. The filtering parameters of the filters 51–53 are then subject to recalculation following the steps already described.

In the FIG. 4 procedure the UPDATE IIR COEFFICIENTS step 86 and the UPDATE FIR COEFFICIENTS step 87 are performed independently during each passage through these two successive steps. The updating of the filter coefficients of the initial one of the cascaded ghost cancelation filters, here the post-ghost filter 51, gives rise to spurious ghosts of the type that could be suppressed by updating of the filter coefficients of the final one of these filters, here the pre-ghost filter 52. Since the UPDATE IIR COEFFICIENTS step 86 and the UPDATE FIR COEFFICIENTS step 87 do not take these spurious ghosts into account, the subsequent recalculation of the weighting coefficients of the initial one of the cascaded ghost cancelation filters during the next passage through these two successive steps will introduce compensatory ghosts that will reduce the spurious ghosts in the final filter response. Since this reduction may not be complete, recalculation of the weighting coefficients of the final one of the cascaded ghost cancelation filters should be provided for. The decision loop around steps 83–89 implements these recalculations.

The FIG. 4 procedure may be modified to perform the UPDATE IIR COEFFICIENTS step 86 after the UPDATE FIR COEFFICIENTS step 87. Performing the steps 86 and 87 in the order the IIR filter 51 and the FIR filter 52 appear in their cascade connection with each other is advantageous in other modifications of the FIG. 4 procedure. In these other modifications of the FIG. 4 procedure, the spurious ghosts calculated as going to be introduced by updating the filter coefficients of the initial one of the cascaded ghost cancelation filters are taken into account, so that the normalized reception channel DFT can be suitably modified before performing the calculations for updating the filter coefficients of the initial one of the cascaded ghost cancelation filters.

FIG. 5 shows a GCR-signal averaging filter 100 that can replace the GCR-signal averaging filter comprising elements 59–69 in the FIG. 2 circuitry. The temporal filter 100 comprises a plurality of 1-line stores 101–108, eight in number, being used for temporarily storing the digital GCR signals separated from respective $19^{th}$ VBI scan lines in eight consecutive fields of digitized composite video signal, as selected by write enable circuitry 110. These stores 101–108 are shown as being provided by random access memory (RAM) addressed by a PIXEL COUNT signal, as would be supplied from the pixel counter 72 of FIG. 2, typically at a rate four times color subcarrier frequency fC. Each RAM has storage capability for a respective scan line of pixel samples supplied at 4 fC rate.

The separation of the digital GCR signals from the rest of the digitized composite video signal at the output of the cascade connection of the ghost-suppression filters 51–53 is carried out by the sequential application of write enable commands to the 1-line stores 101–108 during respective $19^{th}$ VBI scan lines in the eight consecutive fields. The decoder 58 responds to the LINE COUNT signal supplied from the scan line counter 56 of FIG. 2 to generate a ONE indicative of the $19^{th}$ scan line of the current field being scanned. This ONE as most significant bit and a FIELD COUNT signal supplied from the modulo-8 field counter 57 of FIG. 2 as the less significant bits are sequentially decoded by decoders 111–118 to supply write enable commands to the 1-line stores 101–108, respectively.

FIG. 5 explicitly shows the PIXEL COUNT, LINE COUNT and FIELD COUNT signals to the filter-coefficient computer 55. The filter-coefficient computer 55 responds to the LINE COUNT and FIELD COUNT information to confine its applying read enable commands to the 1-line stores 101–108 only during the time between a line (or two) after the $19^{th}$ scan line of each eighth field and before the $19^{th}$ scan line of the next field. The PIXEL COUNT signal clocks the read out Read enable commands are applied simultaneously to the 1-line stores 101–108, so they read in parallel to an averaging network 109. The PIXEL COUNT signal clocks the read out from the 1-line stores 101–108 into the internal memory of the filter-coefficient computer 55. The PIXEL COUNT signal is supplied to the computer 55 as a basis for it to index the writing of its internal memory.

The averaging network 109, composed of digital adders and subtractors, linearly combines the read out contents of the 1-line stores 101–108 to supply to the filter-coefficient computer 55 a digital GCR signal free of horizontal synchronizing pulse, color burst and porch or pedestal information. The signal-to-noise ratio of the data describing the GCR signal can be increased because the GCR signal data being phase-correlated sum arithmetically when combining RAM read-out data, while noise being random-phase sums vectorially.

One skilled in the art of computer input/output design will be enabled by the foregoing description of the FIG. 5 embodiment of the invention to design other embodiments. The RAMs in stores 101–108 can be read from asynchronously, using an address multiplexer to select PIXEL COUNT signal as write addresses to the stores 101–108 and to select read addresses supplied from the filter-coefficient computer 55 in other embodiments of the GCR signal separator 45. The RAMs can be replaced by serial memories of various types in yet other embodiments of the invention.

In still further embodiments of the invention, the stores 101–108 may be 2-line stores, which modification is indicated in parentheses in FIG. 5, rather than 1-line stores; and the decoder 58 may be modified to decode the $20^{th}$ VBI scan line as well as the $19^{th}$, which modification is indicated in parentheses in the caption of the decoder 58 block in FIG. 5. The $20^{th}$ VBI scan line information must repeat from field to field so as not to appear in the output signal the averaging network 109 supplies to the filter-coefficient computer 55. This type of GCR signal separator has the capability of cancelling still longer delayed post-ghosts.

Figure 1:
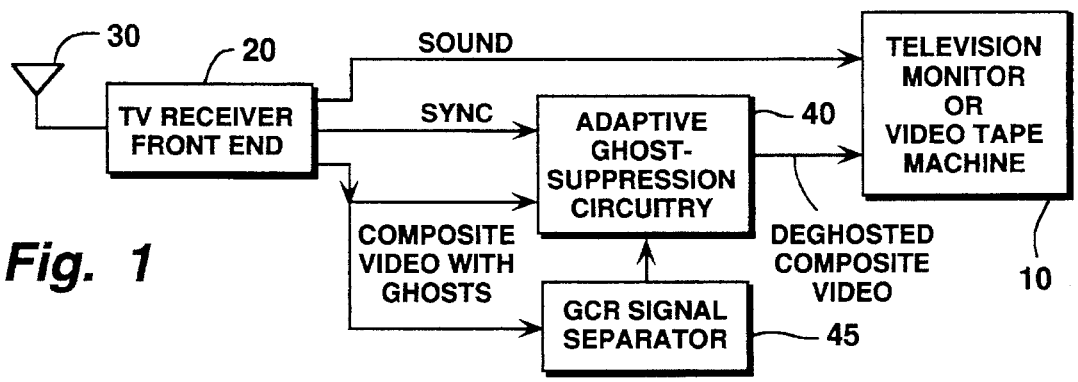
FIG. 1 is a general schematic diagram of a system, comprising a TV receiver or video tape recorder with ghost-suppression circuitry in which the GCR signal acquisition circuitry of the invention may be usefully employed.
Figure 6:
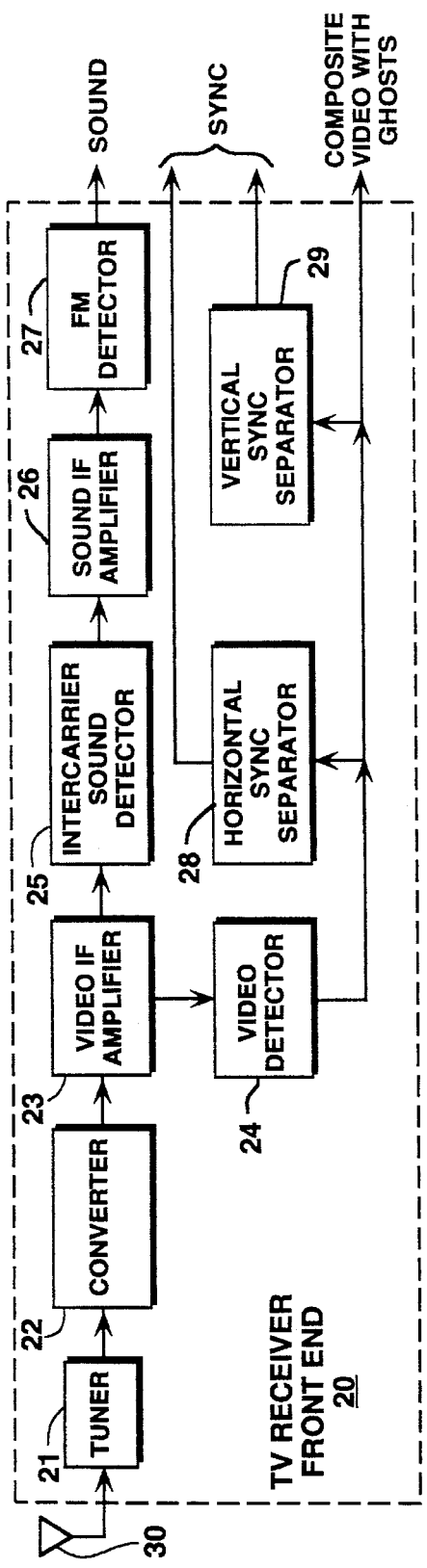
FIG. 6 is a schematic diagram showing in detail typical construction of a TV receiver front end, as known in the prior art and as can be used in the system of FIG. 1.

FIG. 6 shows typical construction of the TV receiver front end 20 used in the FIG. 1 system. A tuner 21 selects one of the television signal supplied at radio frequencies (e.g., via the aerial television antenna 30) for application to a converter 22 (or first detector), which heterodynes the television signal to intermediate frequencies extending typically from 41 to 46 MHz. The resulting IF television signal is applied to a video intermediate-frequency amplifier 23 to be amplified before its application to a video detector 24 and to an intercarrier sound detector 25. The signal from the intercarrier sound detector 25 is the frequency-modulated 41.25 MHz sound carrier heterodyned to 4.5 MHz and is amplified by a sound intermediate-frequency amplifier 26. The resulting amplified sound IF response is supplied to an FM sound detector 27 which detects the sound signal supplied by the TV receiver front end 20 to the television monitor or video tape machine in the FIG. 1 system. The sound IF amplifier 26 typically has amplitude-limiting capability, particularly if the FM sound detector 27 is not of a type (such as the well-known ratio detector) that is quite insensitive to variations in the amplitude of the sound IF signal it is supplied by the sound IF amplifier 26.

A horizontal sync separator 28 and a vertical sync separator 29 respond to the horizontal synchronizing pulses and to the vertical synchronizing pulses, respectively of the composite video signal detected by the video detector 24. The horizontal sync separator 28 supplies separated horizontal synchronizing pulses to the scan line counter 56 as count input signal. The vertical sync separator 29 supplies separated vertical synchronizing pulses to the field counter 57 as count input signal and to the scan line counter 56 as a reset signal for resetting the SCAN LINE COUNT to zero at the beginning of each video frame. Since only very serious ghosting has pronounced effect on TV receiver synchronization, the composite video signal detected by the video detector 24 may be applied directly to the sync separators 28 and 29 as shown in FIG. 6.

Figure 7:
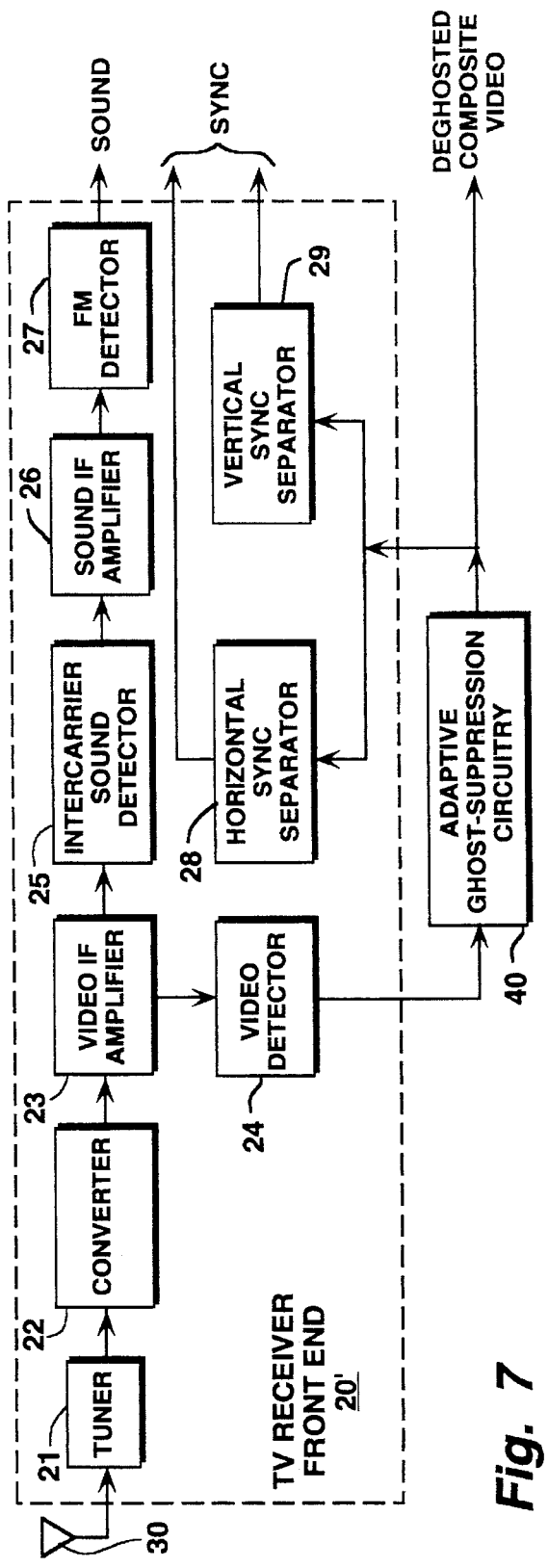
FIG. 7 is a schematic diagram of a modification of the FIG. 6 typical construction of a TV receiver front end, as preferred for use in the system of FIG. 1, wherein the composite video signal supplied to the horizontal and vertical sync separators is deghosted, the composite video signal supplied to the sync separators being taken from the response of the ghost suppression circuitry rather than directly from the video detector.

FIG. 7 shows a modification 20' of the television receiver front end 20 in which modification 20' the composite video signal is supplied to the sync separators 28 and 29 as respective input signals via the adaptive ghost suppression circuitry 40, rather than directly from the video detector 24. This is a preferable arrangement in that the adverse effects of very serious ghosting on TV receiver synchronization can usually be suppressed. Initially, if the filtering parameters of the filters in the ghost suppression circuitry 40 are set to reproduce the composite video signal from the video detector 24, operation is the same as in the FIG. 6 connection. But as the more serious ghosts are suppressed during the procedure of altering the filtering parameters of the filters in the ghost suppression circuitry 40 to suppress ghosts better, the stability of the sync separation process with respect to time can be improved. In the absence of rapid fading, this improvement in sync stability permits closer alignment in modular time of the corresponding pixels of the GCR signals in the successive fields and furthers the procedure of altering the filtering parameters of the filters in the ghost suppression circuitry 40 to suppress ghosts better.

While the invention has been described with particular reference to television broadcasting in accordance with proposed practice in the United States, using the National Television Standards Committee (NTSC) standard and a Bessel chirp GCR signal, one skilled in the television art and acquainted with the foregoing disclosure will be enabled to practice the invention, designing without appreciable difficulty ghost suppression apparatus for different television standards (such as PAL or SECAM), or for other GCR signals of somewhat different design (such as the BTA GCR signal proposed in Japan), or for different television standards with other GCR signals of somewhat different design. This should be borne in mind when construing the scope of the claims which follow.

In the claims which follow, the definite article "the" is not used to refer back to an antecedent. When it is intended to refer back to a previously claimed element or feature thereof, the word "said" is used, rather than "the".

What is claimed is:

1. A combination including:

means for supplying a first composite video signal which is subject to having attendant ghosts and includes at least at times in a prescribed $L^{th}$ line of each field during the vertical blanking interval one of a repeating cycle of M ghost-canceling reference signals of prescribed magnitude and respective phasing, M being an integer larger than one;

filter circuitry for generating a second composite video signal in response to said first composite video output signal, which response is adjusted in response to filter programming signals;

a computer including a computer memory for storing a ghost-free ghost-canceling reference signal, said computer connected for receiving a ghost-canceling reference signal with attendant ghosts for comparison with said ghost-free ghost-canceling reference signal as a basis for calculating said filter programming signals to be such that said second composite video signal is a response to first composite video signal in which said attendant ghosts are substantially reduced; and means for supplying said ghost-canceling reference signal with attendant ghosts comprising:

a horizontal sync separator for separating horizontal synchronizing pulses from one of said first and second composite video signals;

a vertical sync separator for separating vertical synchronizing pulses from one of said first and second composite video signals;

a scan line counter responding to said separated horizontal synchronizing pulses for generating a line count and responding to said separated vertical synchronizing pulses for being reset to an initial line count;

an $L^{th}$-line separator for separating scan lines of said second composite video signal immediately following a prescribed value of said line count being attained which is descriptive of said prescribed line of each field during the vertical blanking interval that includes at least at times one of said M ghost-canceling reference signals;

a field counter responding to said separated vertical synchronizing pulses for generating a field count modulo MN;

means for synchronizing said field count modulo MN to said repeating cycle of said M ghost-canceling reference signals;

a temporal filter combining corresponding pixels from a number MN of successive scan lines as separated by said $L^{th}$-line separator to generate a temporal filter response that is supplied to said computer as said ghost-canceling reference signal with attendant ghosts, N being a positive integer.

2. The combination as set forth in claim 1, wherein said MN is sixteen.

3. The combination as set forth in claim 1, wherein said Lth line is line nineteen of each field.

4. A combination as set forth in claim 1 wherein said M is eight, wherein said M ghost-canceling reference signals comprise respective Bessel chirps of prescribed magnitude and timing within their respective scan lines in the vertical blanking interval, and wherein the respective Bessel chirps of said M ghost-canceling reference signals in each cycle of eight consecutive fields have a prescribed pattern of phasing.

5. The combination as set forth in claim 4, wherein said N is two.

6. A combination as set forth in claim 1, wherein said temporal filter comprises:

a temporary line store;

means for emptying said temporary line store after the $L^{th}$ scan line of every $MN^{th}$ field and before the $L^{th}$ scan line of the next succeeding field;

means for reading the contents of said temporary line store to said computer every said $MN^{th}$ field not before the $L^{th}$ scan line of said $MN^{th}$ field, but before the subsequent emptying of said temporary line store;

means for determining first and second conditions of field count according to the polarity of a component of the ghost-canceling reference signal in each field counted;

means responding to said first condition of field count for adding the $L^{th}$ scan line of the currently counted field to the contents of said temporary line store; and means responding to said second condition of field count for subtracting the $L^{th}$ scan line of the currently counted field from the contents of said temporary line store.

7. A combination as set forth in claim 6 wherein said component of the ghost-canceling reference signal in each field counted, the polarity of which component determines first and second conditions of field count, is a Bessel chirp.

8. A combination as set forth in claim 1 wherein said temporal filter comprises:

a plurality MN in number of temporary line stores, identified by consecutive modulo-MN ordinal numbers first through zeroeth, respectively;

means responding to said field count for selecting the one of said temporary line stores identified by the modulo-MN ordinal number corresponding to the current field count modulo-MN for writing with said $L^{th}$ line, said means for selecting for writing being included within said $L^{th}$-line separator;

means for linearly combining on a corresponding pixel basis the contents of said plurality of temporary line stores as read thereto at prescribed times for being linearly combined according to the polarities of a component of the ghost-canceling reference signal in the respective contents of said temporary line stores, the results of said linear combining being used by said computer as said ghost-canceling reference signal with attendant ghosts.

9. The combination as set forth in claim 1, wherein said horizontal sync separator is connected for separating horizontal synchronizing pulses from said second composite video signal.

10. The combination as set forth in claim 1, wherein said vertical sync separator is connected for separating vertical synchronizing pulses from said second composite video signal.

11. A combination including:

means for supplying a first composite video signal which is subject to having attendant ghosts and includes at least at times in a prescribed $L^{th}$ line of each field during the vertical blanking interval thereof one of a repeating cycle of M ghost-canceling reference signals of prescribed magnitude and respective phasing, M being an integer larger than one;

filter circuitry for generating a second composite video signal in response to said first composite video signal, which response is adjusted in response to filter programming signals;

a computer including a computer memory for storing a ghost-free ghost-canceling reference signal, said computer connected for receiving a ghost-canceling reference signal with attendant ghosts for comparison with said ghost-free ghost-canceling reference signal as a basis for calculating said filter programming signals to be such that said second composite video signal is a response to said first composite video signal in which said attendant ghosts are substantially reduced; and means for supplying said ghost-canceling reference signal with attendant ghosts comprising:

a horizontal sync separator for separating horizontal synchronizing pulses from one of said first and second composite video signals;

a vertical sync separator for separating vertical synchronizing pulses from one of said first and second composite video signals;

a scan line counter responding to said separated horizontal synchronizing pulses for generating a line count and responding to said separated vertical synchronizing pulses for being reset to an initial line count;

an $L^{th}$-and-$(L+1)^{th}$-lines separator, for separating scan lines of said second composite video signal immediately following a prescribed value of said line count being attained which is descriptive of said $L^{th}$ line of each field during the vertical blanking interval that includes at least at times one of said M ghost-canceling reference signals, and for further separating the $(L+1)^{th}$ scan lines of said second composite video signal that immediately follow said $L^{th}$ scan lines;

a field counter responding to said separated vertical synchronizing pulses for generating a field count modulo MN, N being a positive integer and MN being the product of M times N;

means for synchronizing said field count modulo MN to said repeating cycle of said M ghost-canceling reference signals; and a temporal filter combining corresponding pixels from a number MN of successive scan lines as separated by said $L^{th}$-and-$(L+1)^{th}$-lines separator to generate a temporal filter response that is supplied to said computer as said ghost-canceling reference signal with attendant ghosts, said field count modulo MN at the time each of said successive scan lines is separated by said $L^{th}$-and-$(L+1)^{th}$-lines separator determining whether the pixels of that said scan line are to be combined additively or subtractively.

12. The combination as set forth in claim 11, wherein said number MN is sixteen.

13. The combination as set forth in claim 11, wherein said $L^{th}$ line is line nineteen of each field and said $(L+1)^{th}$ line is line twenty of each field.

14. A combination as set forth in claim 11, wherein said M is eight, wherein said M ghost-canceling reference signals comprise respective Bessel chirps of prescribed magnitude and timing within their respective scan lines in the vertical blanking interval, and wherein the respective Bessel chirps of said ghost-canceling reference signals in each cycle of eight consecutive fields have a prescribed pattern of phasing.

15. The combination as set forth in claim 14, wherein said N is two.

16. A combination as set forth in claim 11 wherein said temporal filter comprises:

a temporary two-line store;

means for emptying said temporary two-line store after the $(L+1)^{th}$ scan line of every $MN^{th}$ field and before the $L^{th}$ scan line of the next succeeding field;

means for reading the contents of said temporary two-line store to said computer every said $MN^{th}$ field not before the $(L+1)^{th}$ scan line of said $MN^{th}$ field, but before the subsequent emptying of said temporary two-line store;

means for determining first and second conditions of field count according to the polarity of a component of the ghost-canceling reference signal in each field counted;

means responding to said first condition of field count for adding the $L^{th}$ and $(L+1)^{th}$ scan lines of the currently counted field to the contents of said temporary two-line store; and means responding to said second condition of field count for subtracting the $L^{th}$ and $(L+1)^{th}$ scan lines of the currently counted field from the contents of said temporary two-line store.

17. A combination as set forth in claim 16, wherein said component of the ghost-canceling reference signal in each field counted, the polarity of which component determines first and second conditions of field count, is a Bessel chirp.

18. A combination as set forth in claim 11, wherein said temporal filter comprises:

a plurality MN in number of temporary two-line stores, identified by consecutive by consecutive modulo-MN ordinal numbers first through zeroeth, respectively;

within said $L^{th}$-and-$(L+1)^{th}$-lines separator, means responding to said field count for selecting said $L^{th}$ and $(L+1)^{th}$ lines to write the one of said temporary two-line stores identified by the modulo-MN ordinal number corresponding to the current field count modulo-MN:

means for linearly combining on a corresponding pixel basis the contents of said plurality of temporary two-line stores as read thereto at prescribed times for being linearly combined according to the polarities of a component of the ghost-canceling reference signal in the respective contents of said temporary two-line stores, the results of said linear combining being used by said computer as said ghost-canceling reference signal with attendant ghosts.

19. The combination as set forth in claim 11, wherein said horizontal sync separator is connected for separating horizontal synchronizing pulses from said second composite video signal.

20. The combination as set forth in claim 11, wherein said vertical sync separator is connected for separating vertical synchronizing pulses from said second composite video signal.

21. A combination comprising:

a television receiver front end including a video detector for supplying a first composite video signal which is subject to having attendant ghosts and includes at least at times in a prescribed $L^{th}$ line of each field during the vertical blanking interval thereof one of a repeating cycle of M ghost-canceling reference signals of prescribed magnitude and respective phasing, M being an integer larger than one;

first filter circuitry for generating a second composite video signal in response to said first composite video signal, which first filter circuitry response is adjustable in response to filter programming signals;

a separator for separating said ghost-canceling reference signals and any attendant ghosts thereof from said second composite video signal;

second filter circuitry for combining MN consecutive ones of said ghost-canceling reference signals separated from said second composite video signal, thereby to generate a noise-reduced ghost-canceling reference signal with attendant ghosts as a second filter circuitry response, where N is a positive integer;

a computer including a computer memory for storing a ghost-free ghost-canceling reference signal, said computer connected for receiving said noise-reduced ghost-canceling reference signal with attendant ghosts, for comparison with said ghost-free ghost-canceling reference signal as a basis for calculating said filter programming signals to be such that said attendant ghosts are reduced substantially in said second composite video signal as compared to said attendant ghosts in said first composite video signal.

22. The combination as set forth in claim 21, including:

a horizontal sync separator included in said television receiver front end and connected for separating horizontal synchronizing pulses directly from said first composite video signal.

23. The combination as set forth in claim 22, wherein said separator for separating said ghost-canceling reference signals from said second composite video signal includes:

scan line counter for counting the horizontal synchronizing pulses separated by said horizontal sync separator.

24. The combination as set forth in claim 22, including:

a vertical sync separator included in said television receiver front end and connected for separating vertical synchronizing pulses directly from said first composite video signal.

25. The combination as set forth in claim 24, wherein said separator for separating said ghost-canceling reference signals from said second composite video signal includes:

a scan line counter for counting the horizontal synchronizing pulses separated by said horizontal sync separator to generate a scan line count; and means responsive to the vertical synchronizing pulses separated by said vertical sync separator for periodically resetting said scan line count to an initial value.

26. The combination as set forth in claim 21, including:

a horizontal sync separator included in said television receiver front end, but connected for separating horizontal synchronizing pulses from said first filter circuitry response, rather than directly from said first composite video signal.

27. The combination as set forth in claim 26, wherein said separator for separating said ghost-canceling reference signals from said second composite video signal includes:

a scan line counter for counting the horizontal synchronizing pulses separated by said horizontal sync separator.

28. The combination as set forth in claim 26, including:

a vertical sync separator included in said television receiver front end, but connected for separating vertical synchronizing pulses from said first filter circuitry response, rather than directly from said first composite video signal.

29. The combination as set forth in claim 28, wherein said separator for separating said ghost-canceling reference signals from said second composite video signal includes:

a scan line counter for counting the horizontal synchronizing pulses separated by said horizontal sync separator to generate a scan line count; and means responsive to the vertical synchronizing pulses separated by said vertical sync separator for periodically resetting said scan line count to an initial value.

30. The combination as set forth in claim 21, including:

a vertical sync separator included in said television receiver front end, but connected for separating vertical synchronizing pulses from said first filter circuitry response, rather than directly from said first composite video signal.

\* \* \* \* \*